(12) United States Patent
Narita

(10) Patent No.: US 8,173,269 B2
(45) Date of Patent: May 8, 2012

(54) ALLOY COATING FILM, METHOD FOR PRODUCTION OF ALLOY COATING FILM, AND HEAT-RESISTANT METAL MEMBER

(75) Inventor: Toshio Narita, Sapporo (JP)

(73) Assignee: DBC System Co., Ltd., Sapporo-shi, Hokkaido (JP)

( * ) Notice: Subject to any disclaimer, the term of this patent is extended or adjusted under 35 U.S.C. 154(b) by 443 days.

(21) Appl. No.: 12/520,676

(22) PCT Filed: Dec. 17, 2007

(86) PCT No.: PCT/JP2007/074619
§ 371 (c)(1),
(2), (4) Date: Jun. 22, 2009

(87) PCT Pub. No.: WO2008/078667
PCT Pub. Date: Jul. 3, 2008

(65) Prior Publication Data
US 2009/0317658 A1    Dec. 24, 2009

(30) Foreign Application Priority Data
Dec. 22, 2006  (JP) ................................ 2006-346143

(51) Int. Cl.
*B32B 15/01*   (2006.01)
*C23C 30/00*   (2006.01)
*C22C 19/05*   (2006.01)
*C22C 27/00*   (2006.01)

(52) U.S. Cl. ........ 428/651; 428/650; 428/660; 428/652; 427/405; 427/456; 427/252; 205/170

(58) Field of Classification Search ........................ None
See application file for complete search history.

(56) References Cited

U.S. PATENT DOCUMENTS

| | | | |
|---|---|---|---|
| 6,306,524 B1 | 10/2001 | Spitsberg et al. | |
| 6,746,782 B2 | 6/2004 | Zhao et al. | |
| 6,830,827 B2 | 12/2004 | Narita et al. | |
| 7,192,655 B2 | 3/2007 | Narita et al. | |
| 2005/0031893 A1 * | 2/2005 | Narita et al. | 428/655 |
| 2005/0037222 A1 * | 2/2005 | Narita et al. | 428/544 |

FOREIGN PATENT DOCUMENTS

JP    2001323332 A    11/2001

(Continued)

OTHER PUBLICATIONS

The International Bureau of WIPO, PCT International Preliminary Report on Patentability and Written Opinion for International Application No. PCT/JP2007/074619 dated Jun. 24, 2009.

(Continued)

*Primary Examiner* — Aaron Austin
(74) *Attorney, Agent, or Firm* — Deborah H. Spencer; Moore & Van Allen PLLC

(57) ABSTRACT

In an alloy coating film having a diffusion barrier layer and an aluminum reservoir layer on a substrate, the diffusion barrier layer is composed of a single phase that is a Re—Cr—Ni—Al system σ phase containing Al by less than 1 atomic %, or composed of a first phase which is the Re—Cr—Ni—Al system σ phase and one or more second phases selected from a γ phase, γ' phase and β phase.

21 Claims, 5 Drawing Sheets

FOREIGN PATENT DOCUMENTS

| | | |
|---|---|---|
| JP | 2003213479 A | 7/2003 |
| JP | 2003213480 A | 7/2003 |
| JP | 2003213481 A | 7/2003 |
| JP | 2003213482 A | 7/2003 |
| JP | 20030213483 A | 7/2003 |
| JP | 3810330 A | 9/2003 |
| JP | 3708909 A | 2/2004 |
| JP | 3765292 A | 2/2004 |
| JP | 2004035902 | 2/2004 |
| JP | 2004035911 | 2/2004 |
| JP | 2004039315 A | 2/2004 |
| JP | 3857689 B2 | 9/2006 |
| WO | 03/038151 A1 | 5/2003 |

OTHER PUBLICATIONS

Oforka, NC., et al., Phase equilibria of aluminum-chromium-nickel system at 1423 K, Scandinavian Journal of Metallurgy 16:184-188 (1987).

Takahashi, M., et al, Thermal Barrier Coatings Design for Gas Turbines, Proceedings of ITSC '95, Kobe (May 1995), 83-88.

Hosoda, Hideki, et al., Design of Oxidation Resistant Coating Based on IrAl Alloy, The Third Pacific Rim International Conference on Advanced Materials and Processing (PRICM 3), The Minerals, Metals & Materials Society, 1998, 2379-84.

Govindarajan, S., et al., Development of a Diffusion Barrier Layer for Silicon and Carbon in Molybdenum—a Physical Vapor Deposition Approach, Metallurgical and Materials Transactions A, vol. 30A:799-806 (Mar. 1999).

Huang, W., et al., A thermodynamic description of the Ni-Al-Cr-Re system, Materials Science & Engineering A259:110-119 (1999).

Page, R.A., et al., Inhibition of Interdiffusion from MCrAlY Overlay Coatings by Application of a Ni-Re Interlayer, Journal of Engineering for Gas Turbines and Power, vol. 121;313-319 (Apr. 1999).

Narita, Toshio, et al., Rhenium coating as a diffusion barrier on a nickel-based superalloy at high temperature.oxidation, Materials at High Temperatures 18(S):245-251 (2001).

Matsumura, Y., et al., Oxidation Behavior of a Re-Based Diffusion-Barrier/beta-NiAl coating on Nb-5Mo-15W at high temperatures, Oxidation of Metals, vol. 61, Nos. 1/2:105-124 (Feb. 2004).

Narita, Toshio, et al., Development of Re-Based Diffusion Barrier Coatings on Nb-Based Alloys for High Temperature Applications, Niobium for High Temperature Applications, 99-112, TMS (2004).

Narita, Toshio, et al., Application of Rhenium Coating as Diffusion Barrier to Improve the High Temerpature Oxidation Resistance of Nickel-Based Superalloy, Corrosion 2001 NACE Int'l (2001) T-2F Symposia, Paper No. 01157.

Katsumata, Y., et al., Effect of diffusion barrier coating on oxidation behavior of Hastelloy-X at high temperature, Report of the 123rd Committee on Heat Resisting Materials and Alloys, Japan Society for Promotion of Science, 46, Nos. 2: 183-189 (2005) (English Abstract attached).

Aoki, Y., et al., Engine Rotor Application, Status and Perspective, report of the 123rd Committee on Heat Resisting Materials and Alloys, Japan Society for Promotion of Science, 43, No. 3:257-264 (2002) (English Abstract attached).

Fukumoto, My., et al., Coating Formation of the Nb-based Alloys using Electrolytic Process and its Oxidation Behavior, Report of the 123rd Committee on Heat Resisting Materials and Alloys, Japan Society for Promotion of Science, 43, Nos. 3:383-390 (2002) (English Abstract attached).

* cited by examiner 222, 224, 226   212, 214, 216

ALLOY COATING FILM, METHOD FOR PRODUCTION OF ALLOY COATING FILM, AND HEAT-RESISTANT METAL MEMBER

CROSS-REFERENCE TO RELATED APPLICATION

This application claims priority benefits to International Patent Application No. PCT/JP2007/074619, entitled "Alloy Coating Film, Method for Production of Alloy Coating Film, and Heat-Resistant Metal Member," and filed Dec. 17, 2007, and claims priority to Japanese Patent Application No. 2006-346143, filed Dec. 22, 2006, the entire contents of all of which are incorporated by reference herein in their entirety.

TECHNICAL FIELD

The present invention relates to an alloy coating film, a method for producing an alloy coating film and a heat-resistant metal member that are suitable for application to various members of high temperature apparatuses.

BACKGROUND

Members of high temperature apparatuses such as moving blades and stationary blades of jet engines and gas turbines, combustors, boiler tubes and emission gas purification mufflers of vehicles are often surface-coated for improving their heat resistance and corrosion resistance.

To enhance high temperature corrosion resistance of alloy-made substrates, in general, a coating film is formed by vapor diffusion of Al, Cr, Si, or the like, or diffusion coating such as pack cementation. Such a coating film has a function of producing protective oxide scales (such as $Al_2O_3$, $Cr_2O_3$, $SiO_2$, etc.) of Al, Cr, Si, etc., respectively.

Furthermore, an oxide film protecting the substrate is formed by an overlay coating layer of a high Cr—Ni alloy or MCrAlY (M=Ni, Co, Fe) alloy. Sometimes, the overlay coating layer may be further coated with a ceramic coating. This is generally called thermal barrier coating (TBC). The overlay coating layer is called a bond coat layer as well, and the ceramic coating layer is called a topcoat layer as well. For forming the TBC layer, thermal spraying, electron beam vapor deposition, or the like, is typically used. Layers containing Al such as MCrAlY among these overlay coating layers are called aluminum reservoir layers as well. They form protective Al oxides and thereby maintain sound conditions of coating layers and heat-resistant metal substrates under the coating layers. Under ultra high temperature environments as high as 800 to 1200° C., however, Al atoms contributing to corrosion resistance by forming protective oxide scales (Al oxides) diffuse into the part of the substrate from the coating layer, and alloy elements such as Ni, Co, Ti, Ta, Mo, S, Cr, etc. contained in the substrate diffuse into the part of the coating layer, thereby causing a change in elements themselves and their concentrations of the coating layer. As a result, the oxide scales lose the protective ability with time.

As such, under ultra high temperature environments, diffusion coating or overlay coating lose the ability of forming and maintaining an oxide film for protecting the substrate, as well as the ability of reproducing an oxide to compensate a peeled film portion with time.

Moreover, under ultrahigh temperature environments, mutual diffusion progresses between the coating layer and the substrate, and a resultant change in texture and composition of the substrate causes deterioration of mechanical characteristics of the substrate as well. As a problem of substrates such as Ni-based single crystal superalloy, Ni-based superalloy, Ni-based heat-resistant alloy, and the like, it is known that intermetallic compounds generally called topological closed packs (TCP) precipitate and degrade creep, fatigue and other mechanical properties. This phenomenon is especially prominent in Ni-based single crystal superalloys. More specifically, Al having diffused into the part of the substrate destroys the texture of the substrate (mixture of $\gamma$ and $\gamma'$ phases) in case the substrate is a third generation Ni-based single crystal superalloy, for example, and thereby forms a TCP phase. This results in significantly deteriorating mechanical properties of the Ni-based single crystal superalloy having formed an alloy film on the surface (see, for example, Y. Aoki, M. Arai, M. Hosoya, S. Masaki, Y Koizumi, T. Kobayashi, Engine Rotor Application, Status and Perspective, Report of the 123$^{rd}$ Committee on Heat Resisting Materials and Alloys, Japan Society for Promotion of Science, 43, No. 3 (2002), 257-264 (Literature 1)). Therefore, the industry has been waiting for development of a diffusion barrier layer for effectively preventing diffusion of Al in the aluminum reservoir layer into the substrate.

Heretofore, various diffusion barrier layers for preventing diffusion between a substrate and a coating layer have been proposed (see, for example, S. Govindarajan, J. J. Moore, J. Disam, and C. Suryanarayana; Development of a Diffusion Barrier Layer for Silicon and Carbon in Molybdenum-a Physical Vapor Deposition Approach-, Metallurgical and Materials Transactions A, 30A (1999), 799-806 (Literature 2), M. Takahashi, Y. Ito and M. Miyazaki; Thermal Barrier Coatings Design for Gas Turbines, Proceedings of ITSC' 95, Kobe, (1995), 83-88 (Literature 3), R. A. Page and G. R. Leverant; Inhibition of Interdiffusion From MCrAlY Overlay Coatings by Application of a Ni—Re Interlayer, J. of Engineering for Gas Turbines and Power, 121, (1999), 313-319 (Literature 4), H. Hosoda, T. Kingetsu, and S. Hanada: DESIGN OF OXIDATION RESISTANT COATINGS BASED IN IrAl ALLOY, Proceedings of the 3$^{rd}$ Pacific Rim Conference on Advanced Materials and Processing, edited by M. A. Imam, R. DeNale, S. Hanada, Z. Zhong, and D. N. Lee, TMS (1998), 2379-2384 (Literature 5)). More specifically, used as the diffusion barrier layer are Si or C in Literature 2, $Al_2O_3$ in Literature 3, Ni—Re alloy in Literature 4, and Ir in Literature 5, respectively.

In addition, alloy films containing Re-contained alloys as diffusion barrier layers have been proposed (see, for example, T. Narita, M. Shoji, Y. Hisamatsu, D. Yoshida, M. Fukumoto, and S. Hayashi; Rhenium coating as a diffusion barrier on a nickel-based superalloy at high temperature oxidation, MATERIALS AT HIGH TEMPERATURES, 18 (S), (2001), 245-251 (Literature 6), T. Narita, S. Hayashi, M. Shoji, Y. Hisamatsu, D. Yoshida, and M. Fukumoto, Application of Rhenium Coating as a Diffusion Barrier to Improve the High Temperature Oxidation Resistance of Nickel-based Superalloy, Corrosion 2001 NACE International, Houston Tex. (2001), paper 01157 (Literature 7), M. Fukumoto, Y. Matsumura, S. Hayashi, T. Narita, K. Sakamoto, A. Kasama, and R. Tanaka; Coating Formation on the Nb-based Alloys using Electrolytic Process and its Oxidation Behavior, Report of the 123$^{rd}$ Committee on Heat Resisting Materials and Alloys, Japan Society for Promotion of Science, 43, Nos. 3 (2002), 383-390 (Literature 8), T. Narita, M. Fukumoto, Y. Matsumura, S. Hayashi, A. Kasama, I. Iwanaga, and R. Tanaka; Development of Re-Based Diffusion Barrier Coatings on Nb-Based Alloys for High Temperature Applications, MOBIUM for High Temperature Applications, edited by Y-Won Kim and T. Cameiro, TMS (2004), pp. 99-112 (Literature 9), Y. Matsumura, M. Fukumoto, S. Hayashi, A. Kasama, I.

Iwanaga, R. Tanaka, and T. Narita, Oxidation Behavior of a Re-Based Diffusion-Barrier/β-NiAl Coating on Nb-5Mo-15W at High Temperatures, Oxidation of Metals, 61, Nos. 1/2, (2004), 105-124 (Literature 10), Y. Katsumata, T. Yoshioka, K. Zaini Thosin, S. Hayashi and T. Narita; Effect of diffusion barrier coating on oxidation behavior of Hastelloy-X at high temperature, Report of the 123$^{rd}$ Committee on Heat Resisting Materials and Alloys, Japan Society for Promotion of Science, 46, Nos. 2 (2005), 183-189 (Literature 11), specification of U.S. Pat. No. 6,306,524 (Literature 12), specification of U.S. Pat. No. 6,746,782 (Literature 13), specification of U.S. Pat. No. 6,830,827 (Literature 14), specification of Japanese Patent No. 3708909 (Literature 15), specification of Japanese Patent No. 3765292 (Literature 16), specification of Japanese Patent No. 3810330 (Literature 17), Japanese Patent Laid-open Publication No. 2001-323332 (Literature 18), Japanese Patent Laid-open Publication No. 2003-213479 (Literature 19), Japanese Patent Laid-open Publication No. 2003-213480 (Literature 20), Japanese Patent Laid-open Publication No. 2003-213481 (Literature 21), Japanese Patent Laid-open Publication No. 2003-213482 (Literature 22), Japanese Patent Laid-open Publication No. 2003-213483 (Literature 23), Japanese Patent Laid-open Publication No. 2004-39315 (Literature 24)). Such alloy films are expected to function as a diffusion barrier layer that prevents mutual diffusion of atoms between a substrate and a coating layer and to thereby solve the above-mentioned problems. For example, in case an aluminum reservoir layer (NiCoCrAlY alloy) is applied as a coating layer onto the surface of a substrate, if a diffusion barrier layer 30 of a Re-contained alloy is interposed between a substrate 10 and an aluminum reservoir layer 20 of NiCoCrAlY alloy as shown in FIG. 1, movement of elements of the aluminum reservoir layer 20 into the substrate 10 and movement of elements of the substrate 10 into the aluminum reservoir layer 20 can be prevented. Formed between the substrate 10 and the diffusion barrier layer 30 is an interlayer 40. This interlayer 40 is involved in the substrate 10. The alloy film shown in FIG. 1 is expected to be capable of maintaining properties of the aluminum reservoir layer 20 and the substrate 10 even under super high temperature environments.

Note that Re—Cr—Ni-based alloys include four phases in their crystal phases, namely, γ phase of a Ni-based alloy containing solid-solved Cr and Re, α phase of a Cr-based alloy containing solid-solved Re and Ni, δ phase of a Re-based alloy containing solid-solved Ni and Cr, and σ phase of a $Re_3Cr_2$ alloy containing solid-solved Ni (see W. Huang and Y. A. Chang; A thermodynamic description of the Ni—Al—Cr—Re system, Materials Science and Engineering, A259 (1999), 110-119 (Literature 25)).

Further, it has been reported that the solid-solved amount of Al in the α phase of a Cr—Al system is 0~45 atomic %, solid-solved amount of Al in the γ phase of a Ni—Al system is 0~15 atomic %, and solid-solved amount of Al in the δ phase of a Re—Al system is 0~15 atomic % (see Okamoto H. Journal of Phase Equilibria, (1992) (Literature 26). It has also been reported that, solid-solved amounts of Al and Ni in the α phase of a Ni—Al—Cr system are 0~45 atomic % and 0~13 atomic %, solid-solved amounts of Al and Cr in the β phase are 30~58 atomic % and 0~11 atomic %, solid-solved amounts of Al and Cr in the γ' phase are 16~28 atomic % and 0~7 atomic %, and solid-solved amounts of Al and Cr in the γ phase are 0~15 atomic % and 0~47 atomic % (see N. C. Oforka, C. W. Haworth: Scand, J. Metall. vol. 16, 184-188, (1987) (Literature 27)).

The alloy films proposed by Literatures 2 to 5, which contain Si or C, $Al_2O_3$, Ni—Re alloys and Ir as a diffusion barrier layer, involve the problem that, under super high temperature environments, they lose the function as the diffusion barrier layer due to decomposition of the diffusion barrier layer by reaction between the substrate and the aluminum reservoir layer and cannot perform the barrier function over a long period of time.

In the alloy films proposed by Literatures 6 through 24, which include Re-contained alloys as their diffusion barrier layers, Al in the aluminum reservoir layer diffuses into the substrate whereas alloy elements diffuse from the substrate to the aluminum reservoir layer under high temperature environments. As a result, the aluminum reservoir layer gradually changes in constituent elements, composition and texture, and therefore cannot maintain its resisting ability to high temperature oxidization over a long period of time. In addition, alloy elements having diffused into the aluminum reservoir layer deteriorate the adhesion of the Al oxide ($Al_2O_3$) film and promote exfoliation, thereby rapidly deteriorating the resistance to oxidization of the aluminum reservoir layer.

In addition, under high temperature environments, such diffusion barrier layers change in thickness, composition and texture, and this causes gradual changes of their barrier properties against diffusion of Al into the substrate and diffusion of alloy elements into the aluminum reservoir layer.

Problems with alloy films having Re-contained alloys and Ni aluminide formed on substrates made of Ni-based heat resistant alloys as diffusion barrier layers and aluminum reservoir layers are discussed below in detail taking Literature 11 as a specific example.

A Ni-based group heat-resistant alloy (HASTELLOY-X ("HASTELLOY" is a trademark)) having the nominal composition shown in TABLE 1 (in weight %) was used as the substrate. This substrate was plated with a Ni—Re alloy and Ni. The substrate coated having the plated film as subjected to Cr diffusion coating. Mixed powder (Cr powder+$NH_4Cl$ powder+$Al_2O_3$ powder) was used as a Cr diffusion coating agent. The substrate having the plated film was buried into the mixed powder, and heated in an argon gas atmosphere. Heating temperature and time were 1280° C. and four hours. As a result of the plating and Cr diffusion coating, a diffusion barrier layer of a Re-contained alloy is formed. Subsequently, Ni is plated on the surface of the substrate now having the diffusion barrier layer, thereby forming a Ni-plated film. Thereafter, Al diffusion coating was conducted. In greater detail, the substrate having the Ni-plated film was immersed into mixed powder (Al powder+$NH_4Cl$ powder+$Al_2O_3$ powder (1:1:4 in weight percent) in an alumina crucible, and heated in the argon gas atmosphere at 800° C. for 30 minutes. Next annealed was the substrate after the Al diffusion coating. More specifically, the substrate having passed the Al diffusion coating process was heated in an argon gas atmosphere at 1000° C. for four hours. An alloy film thus obtained was composed of a diffusion barrier layer made of a Re-contained alloy and an overlying aluminum reservoir layer made of Ni aluminide. The Ni heat-resistant alloy having this alloy film was subjected to a high temperature oxidization test. Conditions of the oxidization were: in the atmosphere, at 1100° C., and for 100 hours and 400 hours.

TABLE 1

| Ni | Cr | Mo | Fe | W | C | Si | Co | Mn |
|---|---|---|---|---|---|---|---|---|
| rest | 23.51 | 5.46 | 19.81 | 0.16 | 0.49 | 1.04 | 0.99 | 0.53 |

Test specimens after the high temperature oxidization test at 1100° C. for 100 hours and 400 hours as explained above were cut, ground, observed in cross-sectional texture, and measured in concentration of individual elements by an electron-probe micro analyzer (EPMA). FIG. 2 shows an optical microscopic photograph of a cross-sectional texture of the test specimen subjected to the high temperature oxidization test for 100 hours and concentration distributions (concentration distributions along the X-X line of the photograph) of Ni, Al, Cr, Fe, Mo and Re measured by EPMA. Similarly, FIG. 3 shows an optical microscopic photograph of a cross-sectional texture of the test specimen subjected to the high temperature oxidization test for 400 hours and concentration distributions (concentration distributions along the X-X line of the photograph) of Ni, Al, Cr, Fe, Mo and Re measured by EPMA.

The following results were obtained from the data of FIG. 2.

1) The diffusion barrier layer 30 had the composition of 14.5 atomic % Ni, 20.5 atomic % Mo, 26 atomic % Cr, 28.5 atomic % Re, 7 atomic % Fe, and 0.8 atomic % Al.

2) The diffusion barrier layer 30 formed a continuous layer substantially uniform in thickness.

3) The aluminum reservoir layer 20 had a multiphase structure mainly composed of the β phase 24 and including the γ' phase 26.

4) The interlayer 40 was formed between the substrate 10 made of Ni-group heat-resistant alloys and the diffusion barrier layer 30.

The following results were obtained from the data of FIG. 3.

1) The barrier layer 30 had the composition of 14 atomic % Ni, 28 atomic % Mo, 26.5 atomic % Cr, 21.5 atomic % Re, 7 atomic % Fe, and 2.5 atomic % Al.

2) The diffusion barrier layer 30 was not uniform in thickness. The layer was lost in the region labeled with numeral 88 and changed to the γ phase.

3) The aluminum reservoir layer 20 had a multiphase structure including the β phase 24 and the γ phase 22, and the γ phase 22 had a multiphase structure existing between the β phase 24 and the diffusion barrier layer 30 and also between the β phase 24 and an alumina scale 50, respectively.

4) The interlayer 40 was formed between the substrate 10 made of Ni-group heat-resistant alloys and the diffusion barrier layer 30, and a concentration gradient of Al and alloy elements was observed.

As shown in FIG. 2, the aluminum reservoir layer 20 contained approximately 30 atomic % Al in average, and it is apparent that the diffusion and invasion of Al into the substrate 10 was limited to small regions. It is further apparent that alloy elements contained in the aluminum r reservoir layer 20 occupied several atomic %. That is, the diffusion barrier layer 30 composed of the Re-contained alloy maintained an excellent diffusion barrier property.

As shown in FIG. 3, as a result of a progress of exhaust of Al in the aluminum reservoir layer 20 due to consumption of Al for formation of the alumina scales 50 and diffusion of Al into the substrate 10 when passing through the diffusion barrier layer 30, as well as a progress of diffusion of alloy elements into the aluminum reservoir layer 20, a part of the aluminum reservoir layer 20 changed from the β phase 24 to the γ phase 22. This γ phase 22 contained a large amount of Mo, Cr, Fe having diffused from the substrate 10.

Further, as shown in FIG. 3 with a channel 88, a part of the diffusion barrier layer 30 disappeared, and changed to a discontinuous layer, with the Re-contained alloy having changed to the γ phase.

From the above review, in some of existing alloy films, decomposition of the diffusion barrier layer 30 progresses under high temperature environments, while unevenly reducing in thickness, and ultimately disappear locally until the substrate 10 (including the interlayer 40) and the aluminum reservoir layer 20 get in direct contact. Differences of texture and form between the diffusion barrier layer 30 of FIG. 2 and that of FIG. 3 are considered partly caused by the difference of oxidation time, but mechanisms of changing texture and structure of existing alloy films and mechanisms of losing the barrier functions still remain unexplained.

Therefore, it is desirable that the diffusion barrier layer 30 can effectively maintain the function to prohibit diffusion of Al in the aluminum reservoir layer 20 into the substrate 10 and diffusion of alloy elements in the substrate 10 into the aluminum reservoir layer 20, and can thereby maintain its texture, composition and structure for a long period of time.

SUMMARY OF THE INVENTION

It is therefore an object of the present invention to provide an alloy coating film that can maintain its diffusion barrier property for a long period of time under super high temperature environments, by controlling elements, composition, phases, texture and structure of a Re-contained alloy that forms a diffusion barrier layer and has excellent heat resistance and high temperature oxidation resistance, and also provide a manufacturing method thereof and a heat-resistant metal member using the alloy film.

To solve the problems with diffusion barrier layers of the above-explained existing alloy films, the Inventor of the present invention had theoretical researches of elements, composition, phases, texture and structures of Re-contained alloys that form diffusion barrier layers, and accomplished an alloy coating film having a stable texture and an excellent oxidation resistance for a long period of time under super high environment through verification tests. Results thereof are explained below in detail.

As described in Literatures 6 through 24, Re-contained alloys have been proposed as diffusion barrier layers 30 for existing alloy films. For example, the alloy film described in Literature 13 contains 15~95 atomic % Cr and 5~60 atomic % (Re, W, Ru) as major elements, and additionally contains Ni, Co, Fe and Al. Literature 13 proposes 1~35 atomic % as the concentration range of Al, and TABLE 1 of Literature 13 exemplifies an example of, 1~5 atomic % Al.

Figure 4:
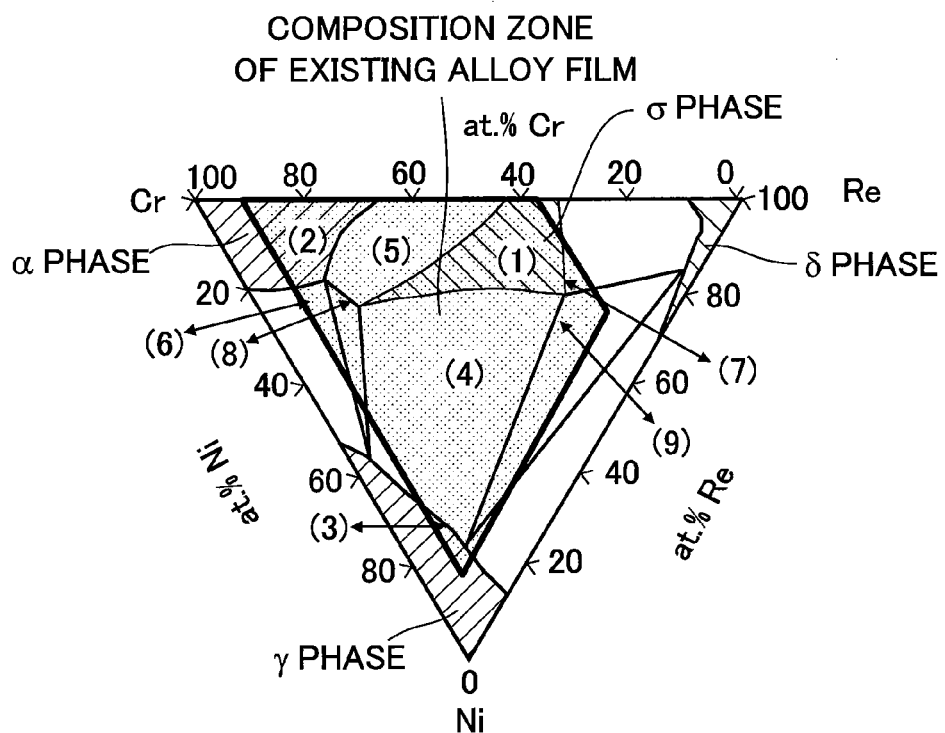
FIG. 4 is a schematic diagram for explaining a composition range of an existing alloy coating film disclosed in Literature 13.

According to Literature 25, with reference to the Re—Cr—Ni system phase diagram shown in FIG. 4, a Re—Cr—Ni system alloy includes four crystal phases, namely, the γ phase of a Ni-based alloy containing solid solved Cr and Re, α phase of a Cr-based alloy containing solid solved Re and Ni, δ phase of a Re-based alloy containing solid solved Ni and Cr and σ phase of a $Re_3Cr_2$ alloy containing solid solved Ni.

In the aforementioned existing alloy coating films, the composition (15~95 atomic % Cr, 5~60 atomic % Re) shown in Literature 13, for example, corresponds to the composition region shown by half-tone dot meshing in the Re—Cr—Ni system phase diagram of FIG. 4. Therefore, the Re-contained alloy (diffusion barrier layer 30) of the aforementioned existing alloy film is expected to comprise one or more phases selected from the group consisting of the σ phase, α phase, γ phase and δ phase.

Among zones labeled with numerals in brackets in FIG. 4, zone (1) is the σ phase, zone (2) is the α phase, and zone (3) is the γ phase, which each is a single-phase zone. Zones (4) through (7) are each composed of two phases, namely, γ phase and δ phase for the zone (4), α phase and σ phase for the zone (5), α phase and γ phase for the zone (6), and σ phase and δ phase for the zone (7). Zones (8) and (9) are each composed of three phases, namely, α phase, γ phase and δ phase for the zone (8), and γ phase, δ phase and σ phase for the zone (9).

According to Literature 26, the solid-solved amount of Al in the α phase of the Cr—Al system is 0~45 atomic %, the solid-solved amount of Al in the γ phase of the Ni—Al system is 0~15 atomic %, and the solid-solved amount of Al in the δ phase of the Re—Al system is 0~1 atomic %. According to Literature 27, solid-solved amounts of Al and Ni in the α phase of the Ni—Al—Cr system are 0~45 atomic % and 0~13 atomic % respectively; solid-solved amounts of Al and Cr in the β phase are 30~58 atomic % and 0~11 atomic % respectively; solid-solved amounts of Al and Cr in the γ' phase are 16~28 atomic % and 0~7 atomic %; solid-solved amounts of Al and Cr in the γ phase are 0~15 atomic % and 0~47 atomic % respectively.

As discussed above, it is appreciated that a relatively large amount of Al can dissolve in the α phase, β phase, γ' phase, and γ phase. Therefore, in case the diffusion barrier layer 30 contains one or more phases selected from the group consisting of the α phase, γ phase, γ' phase and γ-phase in addition to the σ phase, it is readily deduced that Al of the aluminum reservoir layer 20 diffuses into the substrate 10 through the diffusion barrier layer 30.

That is, in the above-mentioned existing alloy films, the barrier characteristic of the diffusion barrier layer 30 is governed by elements, composition, texture and structure. Especially for maintaining an excellent diffusion barrier performance for a long time under super high temperatures, it is particularly important to control the phases, composition, texture and structure that make up the alloy coating film.

Literatures 12 through 24 describe elements and compositions of alloy coating films, but do not disclose anything about phases, textures and structures of alloy coating films.

Furthermore, although solid solubility of Al into Re—Cr—Ni system σ phases that constitute diffusion barrier layers is an important factor that dominates the performance of the diffusion barrier layers, no detailed reports are found in any of Literatures 1 through 27.

Under these circumstances, the Inventor carried out an experiment to ascertain solid solubility of Al into σ phases, using Re—Cr—Ni—Al system alloys. Contents of this experiment, method of analysis, and its result are explained below in detail.

The Inventor of the present invention first weighed out a predetermined amount of metal powder of Re, Cr, Ni, and Al having a purity of 99 atomic % or more as start metals, and a mixed green compact of approximately 10 g in total was prepared. The mixed green compact was molten by using an argon arc furnace and then solidified in a water-cooled mold. An alloy, thus obtained, was subjected to heat treatment in a vacuum furnace at 1300° C. for 200 hours, then encapsulated in a low pressure capsule of quartz, and underwent heat treatment at 1150° C. for 1000 hours. The alloy sample after the heat treatment was took out from the furnace as being encapsulated in the quartz capsule, and quenched in water. The alloy sample, obtained, was cut and polished, and concentrations of its elements were quantitatively analyzed by using an EPMA device. The detectable limit concentration of an element by the EPMA device used here was approximately 0.01 atomic %.

Phases and concentrations of elements forming the start composition of the alloy samples obtained in this manner are collectively shown in TABLE 2.

TABLE 2

| Alloy Sample No. | Annealing Condition | | Result Elements & composition (atomic %) | | | |
|---|---|---|---|---|---|---|
| | Temperature (° C.) | Time (hour) | Phase | Al | Ni | Cr | Re |
| No. 1 | 1150° C. | 1000 hours | γ-phase | 13 | 59.7 | 25 | 2.3 |
| | | | σ-phase | 0.4 | 21 | 50 | 28.6 |
| No. 2 | 1150° C. | 1000 hours | γ'-phase | 20 | 75.7 | 3 | 1.3 |
| | | | σ-phase | 0.7 | 20 | 30 | 49.3 |
| No. 3 | 1150° C. | 1000 hours | β-phase | 35 | 59.8 | 4.5 | 0.7 |
| | | | σ-phase | 0.9 | 18 | 37.1 | 44.0 |
| No. 4 | 1150° C. | 1000 hours | α-phase | 5 | 5 | 70 | 20 |
| | | | σ-phase | 0.3 | 15 | 44.7 | 40 |
| No. 5 | 1150° C. | 1000 hours | γ'-phase | 18 | 77.8 | 3 | 1.2 |
| | | | σ-phase | 0.6 | 22.4 | 30 | 47 |

The data of TABLE 2 tells that, in case the σ phase coexists with the γ-phase, γ' phase, β phase and α phase, respectively, solid solubility of Al into the σ phase is 0.4 atomic % in the No. 1 sample, 0.7 atomic % in the No. 2 sample, 0.9 atomic % in the No. 3 sample, 0.3 atomic % in the No. 4 sample, and 0.6 atomic % in the No. 5 sample, respectively.

The data of TABLE 2 also tells that solid solubility of Re into the γ-phase, γ' phase, β phase and α phase, which coexist with the σ phase, is 2.3 atomic % in the No. 1 sample, 1.3 atomic % and 1.2 atomic % in the No. 2 and No. 5 samples respectively, 0.7 atomic % in the No. 3 sample, and 20 atomic % in the No. 4 sample.

The data of TABLE 2 further tells that solid solubility of Al into the γ-phase, γ' phase, β phase and α phase, which coexist with the σ phase, is 13 atomic % in the No. 1 sample, 20 atomic % in the No. 2 sample, 35 atomic % in the No. 3 sample, 5 atomic % in the No. 4 sample, and 18 atomic % in the No. 5 sample.

The data of TABLE 2 further shows that concentration of Ni contained in the σ phase which coexists with the γ-phase, γ' phase, β phase and α phase is 21 atomic % in the No. 1 sample, 20 atomic % in the No. 2 sample, 22.4 atomic % in the No. 5 sample, 18 atomic % in the No. 3 sample and 15 atomic % in the No. 4 sample.

Figure 1:
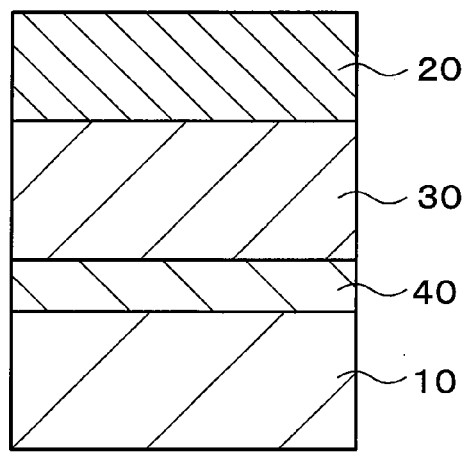
FIG. 1 is a cross-sectional view of an existing alloy coating film.

Let an alloy coating film having a multi-layered structure similar to that shown in FIG. 1 be taken for consideration. Assume, for example, that the substrate is a Ni-based single crystal superalloy composed of the γ-phase and the γ' phase, with an aluminum reservoir layer being composed of the γ' and β phases of a Ni—Al—Cr—Re system. Then, since the σ phase contained in the No. 2 and No. 3 samples in TABLE 2 is considered thermodynamically equilibrium with the γ' or β phase, it may be appreciated to be optimum as a diffusion barrier layer that can maintain a structural stability for a long time under high temperature environments. That is, the σ phase coexisting with a γ' phase and a β phase, that is, having a conjugation relation with them, can exist stably for a long time at high temperatures as a diffusion barrier layer sandwiched between the Ni-based single crystal superalloy of the substrate and the aluminum reservoir layer composed of the γ' and β phases.

Figure 5:
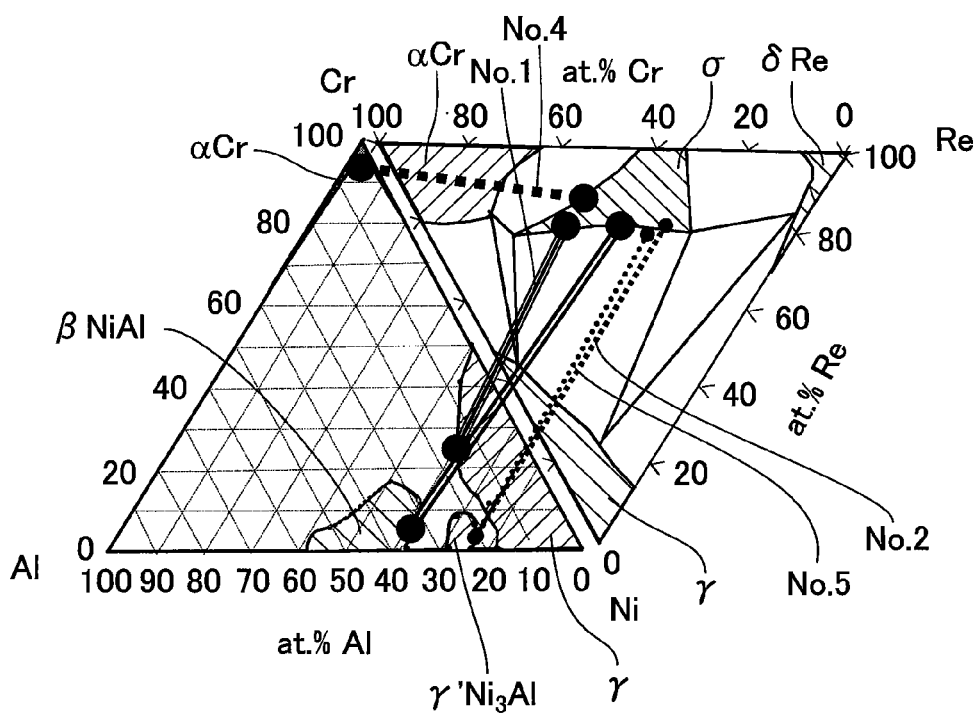
FIG. 5 is a schematic diagram showing a Re—Cr—Ni system phase diagram and a Ni—Al—Cr system phase diagram.

Composition of the σ phase contained in the No. 1 to No. 5 samples of TABLE 2 is shown in a Re—Cr—Ni system phase diagram of FIG. 5 while composition of the γ-phase, γ' phase, β phase and a phase is shown in a Ni—Al—Cr system phase diagram of FIG. 5, and they are individually connected with the conjugate line (tie line). Note that the Re—Cr—Ni system phase diagram puts the Al concentration out of consideration, and the Ni—Al—Cr system phase diagram puts the Re concentration out of consideration. As a result, it has become apparent that the composition of the σ phase of the Re—Cr—Ni system, having coexisted with the γ-phase, γ' phase and β phase of the Ni—Al—Cr system, approximately coincides with the composition given by the conjugate line with the γ-phase of the Re—Cr—Ni system. That is, the Ni concentration range of the σ phase having conjugate lines with the γ-phase, γ' phase and β phase of the Ni—Al—Cr system is 18~22.4 atomic %. This is understood to result from the facts that, as shown in TABLE 2, the solubility of Al into the σ phase is less than 1 atomic %, and the solubility of Re into the γ-phase, γ' phase and β phase is only several atomic % or less.

According to the data of TABLE 2, the concentration of Al that is soluble into the σ phase is 0.3~0.9 atomic %, and this is very low when compared with the solid solubility of Al into the γ-phase, γ' phase and β phase. This result permits the presumption that the σ phase has an excellent property as a barrier against diffusion of Al.

On the other hand, for the purpose of presuming degrees of diffusion of alloy elements into the aluminum reservoir layer through the σ phase, i.e., the diffusion powers of the alloy elements in the σ phase, the Inventor of the present invention prepared a diffusion couple of Ni and Cr as well as a diffusion couple of Re and Cr, and determined diffusion coefficients of the γ-phase, α phase and σ phase through diffusion tests at 1100° C. and 1110° C. for 49 hours and 169 hours. Resultant diffusion coefficients are shown in TABLE 3.

TABLE 3

| Phase | Diffusion Coefficient (m²/s) | Temperature |
| --- | --- | --- |
| γ Phase | $7 \times 10^{-15}$ | 1100° C. |
| α Phase | $1 \times 10^{-14}$ | 1110° C. |
| σ Phase | $1.5 \times 10^{-17}$ | 1100° C. |

The data shown in TABLE 3 demonstrates that the diffusion coefficient of the σ phase has a value smaller than both diffusion coefficients of the γ-phase and the α phase by approximately two digits. That is, it is concluded that the σ phase has an excellent barrier property against diffusion of alloy elements as well.

For the purpose of determining optimum composition, texture and structure for the diffusion barrier layer to stably exist over a long period of time under super high temperatures, the following experiments were carried out.

More specifically, diffusion barrier layers were formed by experimental processes similar to those explained before, and a long time oxidation experiment was conducted at high temperatures. For the experiment, a Ni-based single crystal superalloy, Ni-based heat-resistant alloy and Co-based heat-resistant alloy were used.

TABLE 4

|  | Al | Ti | Ta | Mo | W | Re | Hf | Cr | Co | Ni | Fe |
| --- | --- | --- | --- | --- | --- | --- | --- | --- | --- | --- | --- |
| Ni-based single crystal superalloy | 5.3 | 0.5 | 6.0 | 1.9 | 8.7 | 2.4 | 0.01 | 4.9 | 7.8 | rest | — |
| Ni-based heat-resistant alloy | — | — | — | 9.0 | 0.6 | — | 0.10 | 22.0 | 1.5 | rest | 18.5 |
| Co-based heat-resistant alloy | — | — | — | — | 14.0 | — | 0.10 | 22.0 | rest | 22.0 | 3.0 |

With oxidation test pieces obtained, compositions were determined by an analytic method similar to that explained before. Morphology (whether continuous or discontinuous) of diffusion barrier layers were monitored from their cross-sectional textures. A result of the test is shown in TABLE 5.

TABLE 5

Figure 8:
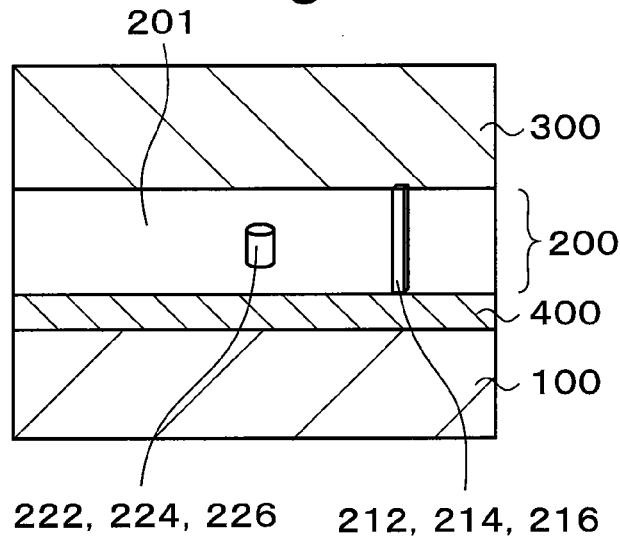
FIG. 8 is a cross-sectional view of an alloy coating film according to the second embodiment of the present invention.
Figure 9:
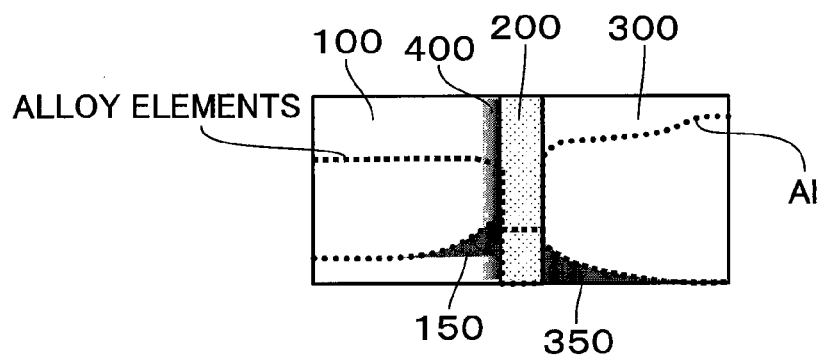
FIG. 9 is a cross-sectional view of a diffusion couple used to evaluate diffusion barrier characteristics of a diffusion barrier layer in an alloy coating film according to the present invention.

|  | Ni | Co | Cr | Re | Mo | Fe | W | Al | Ta | Ni + Co + Fe | Re/ (Re + Mo) | Barrier structure |
| --- | --- | --- | --- | --- | --- | --- | --- | --- | --- | --- | --- | --- |
| Sample A | 17.5 | 1.0 | 27.0 | 34.0 | 0.2 | — | 17.5 | 0.35 | 0.3 | 18.5 | 0.99 | Continuous |
| Sample B | 25.5 | 1.0 | 40.0 | 25.0 | 2.5 | — | 2.5 | 3.0 | 0.1 | 26.5 | 0.91 | Discontinuous |
| Sample C | 14.0 | — | 25.0 | 30.0 | 0.2 | 6.9 | 16.5 | 0.4 | — | 20.9 | 0.99 | Continuous |
| Sample D | 15.3 | 12.3 | 23.4 | 39.3 | 1.9 | — | 2.5 | 0.9 | — | 27.6 | 0.95 | Discontinuous |
| FIG. 8 | 14.5 | — | 26.0 | 28.5 | 20.5 | 9.0 | — | 0.8 | — | 23.5 | 0.61 | Continuous |
| FIG. 9 | 15.0 | — | 28.0 | 23.0 | 29.5 | 8.5 | — | 2.5 | — | 23.5 | 0.43 | Discontinuous |

Oxidation was done in atmosphere at the following temperatures for the following lengths of time.

Figure 2:
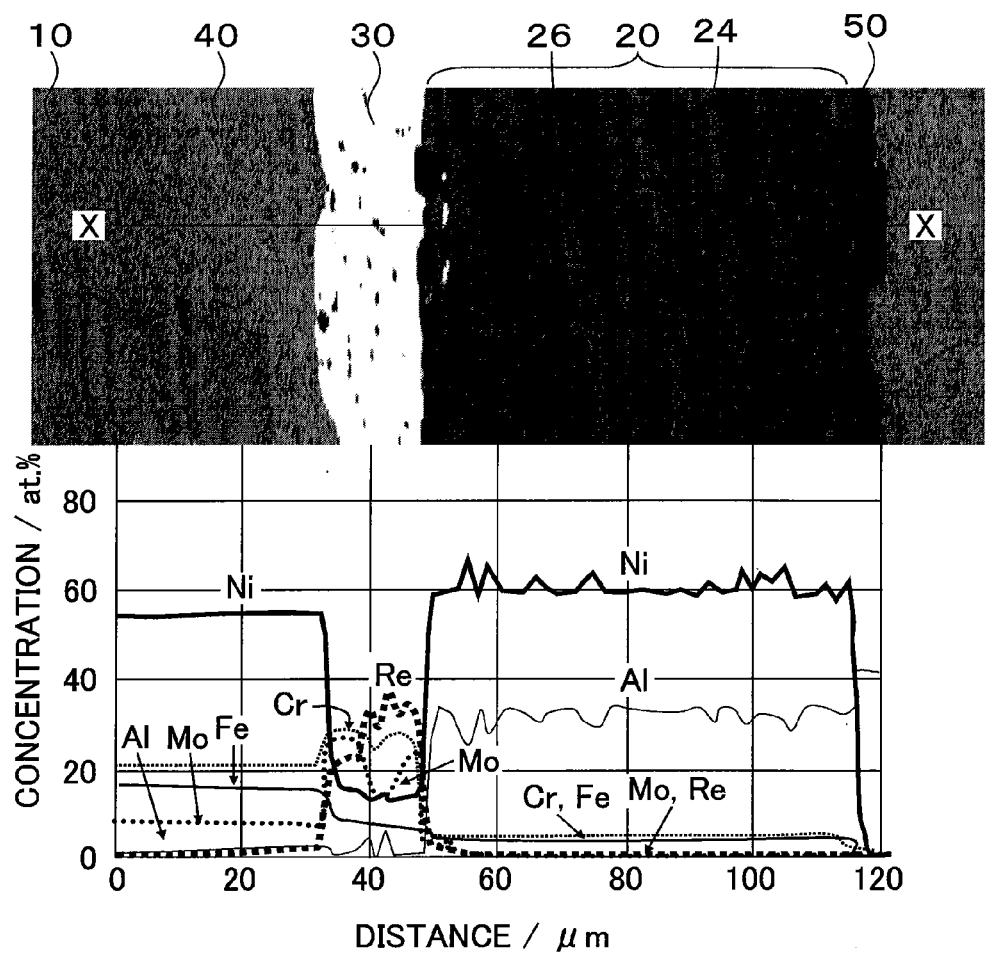
FIG. 2 is a schematic diagram showing a result of an experiment carried out to examine problems with the existing alloy coating film.
Figure 3:
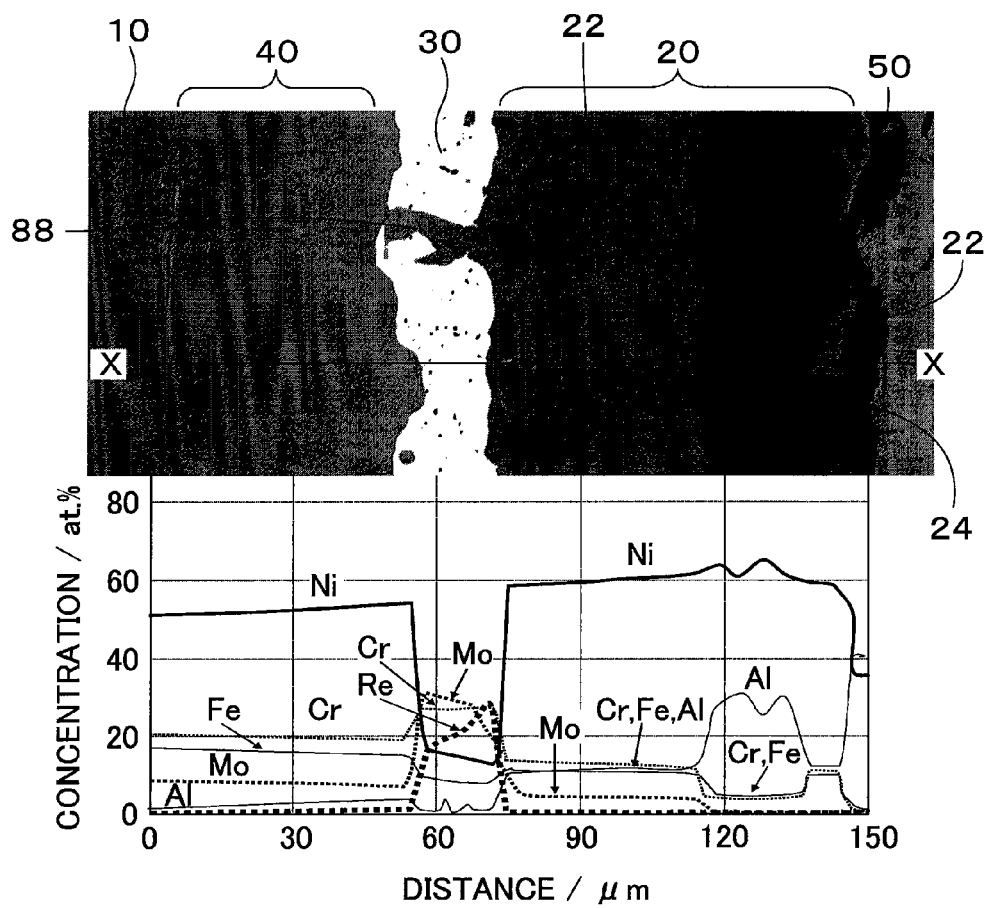
FIG. 3 is a schematic diagram showing a result of an experiment carried out to examine problems with the existing alloy coating film.

| | | |
|---|---|---|
| Sample A | (Ni-based single crystal superalloy) | 1150° C.; 1000 hours |
| Sample B | (Ni-based single crystal superalloy) | 1150° C.; 1000 hours |
| Sample C | (Ni-based heat-resistant alloy) | 1100° C.; 400 hours |
| Sample D | (Co-based heat-resistant alloy) | 1100° C.; 600 hours |
| FIG. 2 | (Ni-based heat-resistant alloy) | 1100° C.; 100 hours |
| FIG. 3 | (Ni-based heat-resistant alloy) | 1100° C.; 400 hours |

From the result of TABLE 5, it is apparently required that Al concentration is 0.9 atomic % or less, (Ni+Co+Fe) concentration is 23.5 atomic % or less, and (Re/(Re+Mo)) is 0.61 or more to ensure that the diffusion barrier layer maintains its continuity.

Figure 6:
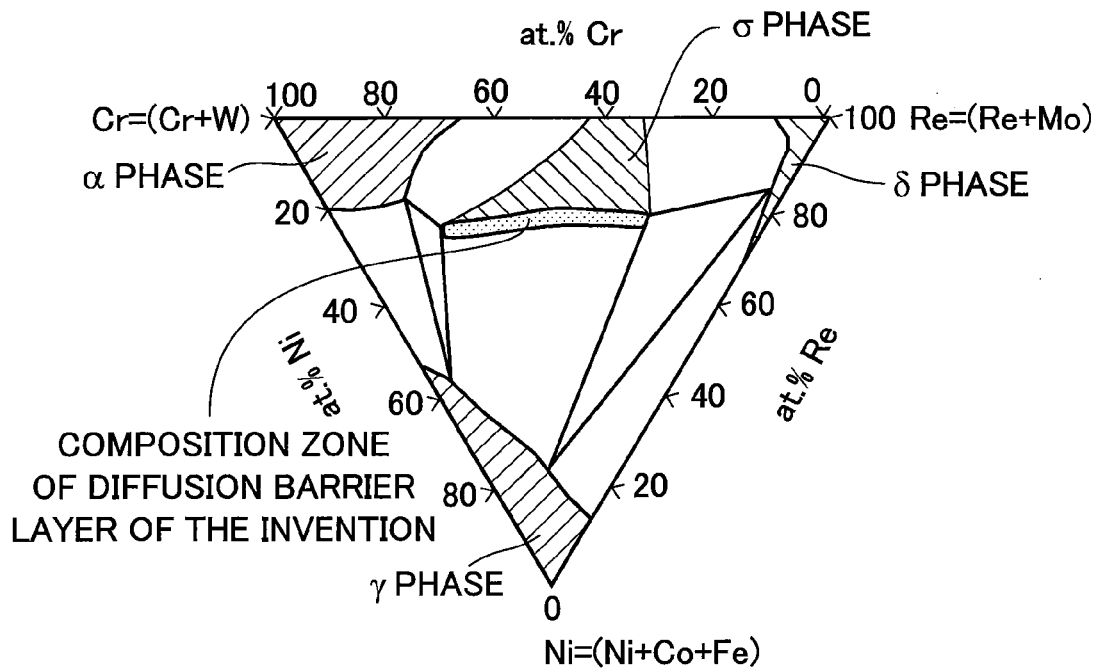
FIG. 6 is a schematic diagram for explaining a composition range of a diffusion barrier layer in an alloy coating film according to the present invention.

Because of the results of these researches, the Inventor proposes the limited zone shown by meshing in the Ni—Cr—Re system phase diagram of FIG. 6 as the composition of the σ phase having an excellent diffusion barrier performance. More specifically, 1) Al concentration of the σ phase is preferably less than 1 atomic %, and more preferably in the range of 0.01 atomic %≦Al concentration≦0.99 atomic %;
2) composition of the σ phase is in the range of 20~55 atomic % as the sum of Re and Mo, 20~60 atomic % as the sum of Cr and W, and 15~25 atomic % as the sum of Ni, Co and Fe, which corresponds to the meshed zone in FIG. 6; and
3) in addition to the requirements in 2 above, the value of Re/(Re+Mo) is 0.5 or more.

On the other hand, if the substrate is a Ni-based single crystal superalloy, then the substrate normally includes the γ-phase and the γ' phase. In a second-generation Ni-based single crystal superalloy (TMS-82+ ("TMS" is a registered trademark)), for example, concentration of Al is 12.2 atomic %. In case the aluminum reservoir layer is a nickel aluminide system alloy, it normally includes one or more of the γ-phase, γ' phase and p phase. Further, since Al in the aluminum reservoir layer is consumed for formation of oxides during storage under high temperatures, the phase may change from the β phase to the γ' phase and further to the γ-phase. Therefore, it is desirable that the σ phase constituting the diffusion barrier layer can coexist with the β phase, γ' phase and γ-phase. That is, it is reasonably explained from thermodynamic consideration as well that a diffusion barrier layer having an excellent texture stability especially at high temperatures is desirable to have, as the composition of its σ phase, a composition with a conjugate line with phases of the aluminum reservoir layer and the substrate. In other words, it has been proved by the experimental results shown in TABLE 5 that the composition of the σ phase applicable as the diffusion barrier layer is limited to the composition range shown by meshing in FIG. 6.

Reasons why the composition range of the above-mentioned σ phase is limited to the meshed zone of FIG. 6 are explained below in detail by the following. The alloy coating has a multi-layered structure similar to that shown in FIG. 1 and has a conjugate relation with phases of the substrate and the aluminum reservoir layer as shown in FIG. 5. Therefore, in case the substrate is a Ni-based superalloy, the σ phase having a composition outside the composition zone shown by meshing in FIG. 6, e.g. the σ phase of the No. 5 sample, does not have a conjugate relation with the substrate, and does not appear in the diffusion barrier layer.

Therefore, the present invention proposes an alloy composed of the σ phase falling in the composition zone shown by meshing in FIG. 6 as a diffusion barrier layer having an excellent diffusion barrier capability. In FIG. 6, the sum of Re and Mo is dealt with as Re, the sum of Cr and W as Cr, and the sum of Ni, Co and Fe as Ni.

In addition, as explained above, Al concentration of the σ phase proposed by the present invention is less than 1 atomic %, and more preferably in the range of 0.01~0.99 atomic %. That is, if the Al concentration of the diffusion barrier layer is 1 atomic % or more, it cannot work as an excellent diffusion barrier. Reasons thereof are explained below in detail.

When an alloy coating film having a multi-layered structure similar to that shown in FIG. 1 is formed on a substrate, second phases such as γ-phase, γ' phase and β phase may inevitably get mixed in a diffusion barrier layer to mix with the σ phase. Such a diffusion barrier layer having a phased mixed structure of the σ phase and a second phase, in general, has the drawback of being inferior in barrier property against diffusion of Al and alloy elements.

The Inventor of the present invention solved the aforementioned drawback by controlling the texture and the structure of the mixed phases of the σ phase and the second phase referred to above. That is, the Inventor found it possible to attain an excellent barrier property by composing the diffusion barrier layer of the σ phase and controlling the texture and distribution of the second phase such as γ phase, γ' phase or β phase. This is explained below in detail.

The Inventor proposes a texture and structure in which a second phase (γ-phase, γ' phase or β phase) is enclosed inside the σ phase. By embracing the second phase inside the diffusion barrier layer composed of the σ phase, diffusion of Al in the aluminum reservoir layer into the substrate and diffusion of alloy elements of the substrate into the aluminum reservoir layer can be prohibited effectively.

In case the second phase (γ-phase, γ' phase or β phase) penetrates the σ phase and gets in connection with the interlayer and the aluminum reservoir layer, the second phase acts as a so-called channeling, and undesirably allows diffusion of Al from the aluminum reservoir layer into the substrate (including the interlayer) and diffusion of alloy elements from the substrate into the aluminum reservoir layer. This results in a decrease of the oxidation resistance of the aluminum reservoir layer and a deterioration of the mechanical properties of the substrate due to precipitation of TCP phases.

In case the diffusion barrier layer is composed of mixed phases including the second phase (γ phase, γ' phase or β phase), the second phase can contain a large amount of solid solution of Al as explained above. Therefore, average Al concentration of the diffusion barrier layer may increase to 1 atomic % or more. That is, existence of the second layer makes it understood easier that the Al concentrations of diffusion barrier layers disclosed in Literatures 6 through 24 are as high as 1 atomic % or more. However, regarding the existing alloy films referred to above, no teaching is found about phases, texture and structure of a diffusion barrier layer.

The present invention has been made through his own theoretical, experimental researches and studies explained above.

The first aspect of the invention is an alloy coating film comprising:
    a diffusion barrier layer on a substrate; and
    an aluminum reservoir layer on the diffusion barrier layer,
    wherein the diffusion barrier layer is composed of a single phase which is a Re—Cr—Ni—Al system σ phase containing Al by less than 1 atomic %.

The σ phase which composes the diffusion barrier layer typically contains Al by 0.01 atomic % or more. Preferably, it contains Al by 0.01~0.99 atomic %. The σ phase preferably has a conjugate relation with one or more phases selected from the group consisting of the Ni—Al—Cr—Re system γ-phase, γ' phase and β phase, and preferably has end compositions of conjugate lines. Additionally, the σ phase preferably contains Ni, Co and Fe by 15~25 atomic % in total; Cr and W by 20~60 atomic % in total; and Re and Mo by 20~55 atomic % in total. Further, the sum of Ni, Co, Fe, Cr, W, Re and Mo is preferably less than 100 atomic %. In this case, the ratio of the atomic % of Re (Re/Re+Mo) relative to the total atomic % of Re and Mo is preferably 0.5 or more.

The second aspect of the invention is an alloy coating film comprising:
  a diffusion barrier layer on a substrate; and
  an aluminum reservoir layer on the diffusion barrier layer,
  wherein the diffusion barrier layer is composed of a first phase which is the σ phase of a Re—Cr—Ni—Al system and one or more second phases selected from the group consisting of a γ-phase, γ' phase and β phase.

Concentration of Al contained in the σ phase as the first phase need not be limited to the amount less than 1 atomic % as recited in the first aspect of the invention, and may be 1 atomic % or more. Typically, the σ phase contains Al by 0.01 atomic % or more. To prevent a so-called channeling, the second phase is preferably enclosed inside the diffusion barrier layer. In a Ni—Al—Cr—Re system phase diagram, the first phase and second phase preferably has conjugate relations, between the σ phase and the γ-phase, between the σ phase and the γ'-phase, between the σ phase and the β phase, among the σ phase, γ-phase and γ' phase, among the σ phase, γ-phase and β phase, among the σ phase, γ' phase and β phase, and among the σ phase, γ-phase, γ' phase and β phase, respectively, and preferably have end compositions of conjugate lines respectively. The second phase preferably comprises the γ-phase, γ' phase and β phase of a Ni—Cr—Al—Re system, which satisfy the following conditions respectively. Namely, the above γ-phase preferably contains Al by 0.01~15 atomic %, Cr, W and Mo by 5~45 atomic % in total, Re by 0.01~10 atomic %, and Ni, Co and Fe by 33~91.9 atomic % in total, in which the total amount of Al, Cr, W, Mo, Re, Ni, Co and Fe is equal to or less than 100 atomic %. The above γ'-phase preferably contains Al by 16~28 atomic %, Cr, W and Mo by 1~10 atomic % in total, Re by 0.01~2 atomic %, and Ni, Co and Fe by 60~82 atomic % in total, in which the total amount of Al, Cr, W, Mo, Re, Ni, Co and Fe is equal to or less than 100 atomic %. The above β phase preferably contains Al by 30~50 atomic %, Cr, W and Mo by 0.01~10 atomic % in total, Re by 0.01~1 atomic %, and Ni, Co and Fe by 40~68.8 atomic % in total, in which the total amount of Al, Cr, W, Mo, Re, Ni, Co and Fe is equal to or less than 100 atomic %.

The third aspect of the invention is a method of producing an alloy coating film including:
  a diffusion barrier layer on a substrate; and
  an aluminum reservoir layer on the diffusion barrier layer,
  wherein the diffusion barrier layer is composed of a single phase which is the σ phase of a Re—Cr—Ni—Al system containing Al by less than 1 atomic %,
  the method comprising:
  forming the diffusion barrier layer and the aluminum reservoir layer on the substrate by two or more processes selected from the group consisting of plating, heat treatment, Cr diffusion treatment and Al diffusion treatment.

The fourth aspect of the invention is a method of producing an alloy coating film including:
  a diffusion barrier layer on a substrate; and
  an aluminum reservoir layer on the diffusion barrier layer,
  wherein the diffusion barrier layer is composed of a first phase which is the σ phase of a Re—Cr—Ni—Al system and one or more second phases selected from the group consisting of the γ-phase, γ' phase and β phase of the same system,
  the method comprising:
  forming the diffusion barrier layer and the aluminum reservoir layer on the substrate by two or more processes selected from the group consisting of plating, heat treatment, Cr diffusion treatment and Al diffusion treatment.

The fifth aspect of the invention is a heat-resistant metal member having an alloy coating film comprising:
  a metal substrate;
  a diffusion barrier layer on the metal substrate; and
  an aluminum reservoir layer on the diffusion barrier layer,
  wherein the diffusion barrier layer is composed of a single phase which is the σ phase of a Re—Cr—Ni—Al system containing Al by less than 1 atomic %.

The sixth aspect of the invention is a heat resistant metal member having an alloy coating film, comprising:
  a metal substrate;
  a diffusion barrier layer on the metal substrate; and
  an aluminum reservoir layer on the diffusion barrier layer,
  wherein the diffusion barrier layer is composed of a first phase which is a Re—Cr—Ni—Al system σ phase and one or more second phases selected from the group consisting of the γ phase, γ' phase and β phase.

In the first to sixth aspects of the invention, the substrate or metal substrate may be any appropriate one selected to satisfy certain characteristics required for intended applications and functions without other limitations. For example, various alloys, such as Ni-based single crystal superalloys, Ni-based superalloys, Ni-based heat resistant alloys, or the like, may be used. The diffusion barrier layer may contain, where necessary, 0.01~5 atomic % of one or more elements selected from the group consisting of V, Nb, Ta, Pt, Ir, Ru, Ti, Mn, Si, Hf, Y, C and B. The aluminum reservoir layer may have any constituent elements, texture, structure, and so on, that are selected appropriately without particular limitations, but preferably comprises one or more phases selected from the group consisting of the β phase, γ' phase and γ-phase of a Ni—Cr—Al—Re system satisfying the following conditions. Namely, the above β phase contains 30~50 atomic % Al, 0.01~10 atomic % Cr, 0.01~1 atomic % Re and 40~69.8 atomic % Ni, in which the total amount of these Al, Cr, Re and Ni is equal to or less than 100 atomic %. The above γ' phase contains 16~28 atomic % Al, 0.01~8 atomic % Cr, 0.01~2 atomic % Re and 67~80.8 atomic % Ni, in which the total amount of these Al, Cr, Re and Ni is equal to or less than 100 atomic %. The above γ phase contains 5~15 atomic % Al, 5~45 atomic % Cr, 0.01~8 atomic % Re and 39~89.8 atomic % Ni, in which the total amount of these Al, Cr, Re and Ni is equal to or less than 100 atomic %. The aluminum reservoir layer may additionally contain, where necessary, one or more elements selected from the group consisting of V, Nb, Ta, Pt, Ir, Ru, Co, Fe, Ti, Mn, Si, Hf, Zr, and Y by 0.01~5 atomic %. The alloy coating film typically includes an interlayer between the substrate and the diffusion barrier layer. The interlayer typically comprises a Ni—Cr—Al—Re-based γ' phase containing 16~28 atomic % Al, 0.01~8 atomic % Cr, 0.01~2 atomic % Re and 67~83.7 atomic % Ni, while the total amount of these Al, Cr, Re and Ni is equal to or less than 100 atomic %; a Ni—Cr—Al—Re-based γ phase containing 5~15 atomic % Al, 5~45 atomic % Cr, 0.01~8 atomic % Re and 39~89.8 atomic % Ni, while the total amount of these Al, Cr, Re and Ni is equal to or less than 100 atomic %; and a Re—Cr—Ni—Al-based σ phase containing 0.01—0.99 atomic % Al. The interlayer may additionally contain, where necessary, one or more elements selected from the group consisting of V, Nb, Ta, Pt, Ir, Ru, Co, Fe, Ti, Mn, Si, Hf, Zr, Y, C, and B by 0.01~5 atomic %. In case that B is added to the interlayer, Ni—B based or Ni—W—B based electroless plating is a preferable process for addition of B. However, any other appropriate process may be used. It is desirable for the diffusion barrier layer to lie on the substrate as a continuous film.

Typical applications of heat resistant metal members according to the fifth and sixth aspects of the invention are moving blades or stationary blades of jet engines or gas turbines; heat exchange members or burner nozzles of combustors or boilers; mufflers or turbocharger rotors of vehicles, among others.

According to the present invention, it is possible to maintain the expected barrier property of the diffusion barrier layer for a long extension of time even under superhigh temperature environments and thereby maintain an intended resistance to high temperature oxidation of the alloy coating film as well as intended mechanical properties of the substrate having the alloy coating film for a long span of time. Therefore, the present invention can enhance the reliability and lifetime of various high temperature apparatus members that should work in superhigh temperature environments and other stressed environments.

SPECIFIC EXAMPLES

Some embodiments of the present invention are explained below with reference to the drawings. In all figures showing embodiments of the invention, common or equivalent portions are labeled with common reference numerals.

Figure 7:
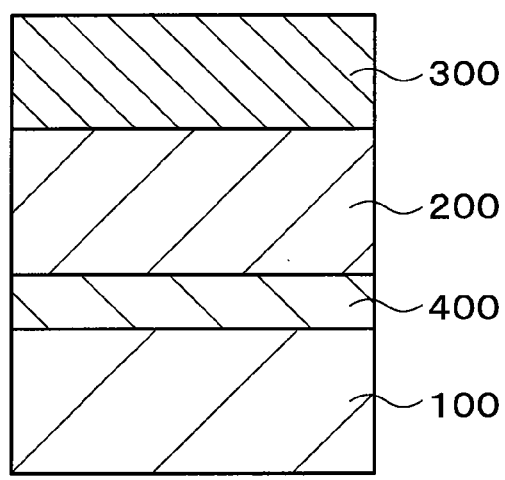
FIG. 7 is a cross-sectional view of an alloy coating film according to the first embodiment of the present invention.

FIG. 7 shows an alloy coating film according to the first embodiment of the invention.

As shown in FIG. 7, the alloy coating film has a diffusion barrier layer 200 and an aluminum reservoir layer 300 on a substrate 100, and includes an interlayer 400 between the substrate 100 and the diffusion barrier layer 200.

The substrate 100 is an alloy such as a Ni-based single crystal superalloy, Ni-based superalloy or Ni-based heat-resistant alloy, for example.

The diffusion barrier layer 200 is composed of a single phase, namely, the σ phase of a Re—Cr—Ni—Al system, containing Al by less than 1 atomic %, more preferably in the range of 0.01~0.99 atomic %. The σ phase composing the diffusion barrier layer 200 has conjugate relations with one or more phases selected from the group consisting of the γ-phase, γ' phase and β phase of a Ni—Al—Cr—Re system, and has end compositions of conjugate lines. The σ phase may contain, for example, Ni, Co and Fe by 15~25 atomic % in total, Cr and W by 20~60 atomic % in total, and Re and Mo by 20~55 atomic % in total, and the total amount of these Ni, Co, Fe, Cr, W, Re and Mo is less than 100 atomic %. In this case, the ratio of Re relative to the sum of Re and Mo (Re/Re+Mo) in atomic % is controlled to be 0.5 or more. The diffusion barrier layer 200 has the role of prohibiting diffusion of Al from the aluminum reservoir layer 300 into the substrate 100 and diffusion of constituent elements of the substrate 100 into the aluminum reservoir layer 300. Constituent alloy elements of the diffusion barrier layer 200 may additionally include one or more elements selected from the group consisting of Nb, Zr and Hf by 0.1~15 atomic % due to contamination from the substrate 100, aluminum reservoir layer 300 or external environment as a result of a long-time use. Similarly, the alloy that forms the diffusion barrier layer 200 may additionally contain one or more elements selected from the group consisting of V, Ta, Pt, Ir, Ru, Ti, Fe, Mn, Si, Y, C, and B by 0.01~5 atomic %. Thickness of the diffusion barrier layer 200 may be determined appropriately. However, taking account of its mechanical properties and long-time stability of the texture, the thickness is preferably in the range from 3 μm to 15 μm, and more preferably in the range from 5 μm to 10 μm.

The aluminum reservoir layer 300 comprises an alloy containing Al, and it is the layer forming protective oxide scales (alunmina coating). The aluminum reservoir layer 300 can act as a bond coat layer for a heat shield coating as well.

The alloy forming the aluminum reservoir layer 300 preferably satisfies the following conditions:

(1) being capable of forming and maintaining protective oxide scales, i.e. a protective alumina coating, and quickly reproducing the protective alumina coating upon occurrence of exfoliation; and (2) refraining from reaction with the diffusion barrier layer 200 and being excellent in compatibility.

As an aluminum reservoir layer 300 meeting the requirement (1) above, there are γ, γ' and β phases of Ni—Al—Cr—Re system alloys. Further, other elements such as Co, Pt, Ir, etc. may be added. In some cases, Zr, Hf, Y, etc. that are believed to improve adhesiveness of alumina coatings may be added. When abilities of forming, maintaining and reproducing an alumina coating are taken into consideration, alloys containing a high concentration of Al are desirable. However, from the standpoint of the requirement of compatibility with σ phases mentioned in (2) above, δ($Ni_2Al_3$) phases having an Al concentration of approximately 60 atomic %, β phases having an Al concentration of 50 atomic % or more, and γ-phases containing Al by 5 atomic % or less react with σ phases, respectively, and cause the diffusion barrier layer 200 to decompose and vanish. Therefore, desirable Al concentration of the aluminum reservoir layer 300 is in the range of 5~50 atomic %.

In case the substrate 100 is a Ni-based single crystal superalloy, Ni-based superalloy or Ni-based alloy, for example, the aluminum reservoir layer 300 may be a mixture of the γ' phase of a Ni—Al—Cr—Re system alloy containing 16~28 atomic % Al and 1~8 atomic % Cr, and the β phase of the same system alloy containing 30~50 atomic % Al and 1~10 atomic % Cr. Otherwise, the alloy forming the aluminum reservoir layer 300 may be a mixture of the γ' phase containing 16~28 atomic % Al and 1~8 atomic % Cr, and the γ phase containing 5~15 atomic % Al and 1~25 atomic % Cr; a mixture of the β phase containing 30~50 atomic % Al and 1~10 atomic % Cr, and the γ phase containing 5~15 atomic % Al and 15~45 atomic % Cr; or a mixture of the β phase containing 30~50 atomic % Al and 1~10 atomic % Cr, γ' phase containing 16~28 atomic % Al and 1~8 atomic % Cr and γ phase containing 5~15 atomic % Al and 15~25 atomic % Cr. These compositions make it possible for the aluminum reservoir layer 300 to form and maintain a protective alumina coating excellent in protective efficiency and reliability and to reproduce it when exfoliation or cracks occur.

The alloy that forms the aluminum reservoir layer 300 may contain elements other than the above-mentioned elements (Al, Cr, Ni). For example, the alloy of the aluminum reservoir layer 300 may contain Pt and Ir by 0.1~20 atomic % in total, and may further contain one or more elements selected from the group consisting of Re, Co, Fe, Ti, Ru, Mn, Si, Zr, Mo, Ta, Hf, and Y by 0.01~5 atomic %.

The interlayer 400 includes the γ' phase of a Ni—Al—Cr—Re system alloy, for example, containing 16~28 atomic % Al, 0.01~8 atomic % Cr and 67~83.7 atomic % Ni, the γ phase containing 5~15 atomic % Al, 5~45 atomic % Cr and 39~89.9 atomic % Ni, and the σ phase containing 0.01~0.99 atomic % Al. The interlayer 400 may additionally contain one or more elements selected from the group consisting of V, Nb, Ta, Pt, Ir, Ru, Co, Fe, Ti, Mn, Si, Hf, Zr, Y, C, and B by 0.01~5 atomic %.

For producing this alloy coating film, the diffusion barrier layer 200 and the Al reservoir layer 300 are formed on the substrate 100, for example, by combining two or more processes selected from the group consisting of plating, heat treatment, Cr diffusion treatment and Al diffusion treatment. These plating, heat treatment, Cr diffusion treatment and Al diffusion treatment are known techniques. It is also possible to form an overlay coating of MCrAlY(M=Ni, Co, Fe) and nickel aluminide as the aluminum reservoir layer 300 by using solution spraying or thermal spraying or electron beam physical vapor deposition (EBPVD). In the process of forming the diffusion barrier layer 200 and the Al reservoir layer 300, the interlayer 400 is formed between the substrate 100 and the diffusion barrier layer 200.

As explained above, in the alloy coating film according to the first embodiment, since the diffusion barrier layer 200 is composed of a single phase, i.e. the Re—Cr—Ni—Al system σ phase containing Al by less than 1 atomic %, and more preferably by 0.01~0.99 atomic %, it can maintain an expected barrier property for a long time even under superhigh temperature environments. This leads to maintaining the resistance to high temperature oxidation of the alloy coating film itself and mechanical properties of the substrate 100 coated by the alloy film for a long time, and further to improving reliability and lifetime of various high temperature device members that work under superhigh temperature environments and stressed environments.

By forming the alloy coating film according to the first embodiment on a metal substrate, it is possible to obtain an excellent heat-resistant metal member. The heat-resistant metal member may have the alloy coating film to coat the surface of the metal substrate, or may include the alloy coating film to interpose between the metal substrate and a TBC layer. Examples of the heat-resistant metal member are parts of jet engines and gas turbines, moving blades, stationary blades, heat exchange members of burners and boilers, burner nozzles, emission gas purification mufflers of vehicles, and rotors of turbochargers.

FIG. 8 shows an alloy coating film according to the second embodiment of the invention.

As shown in FIG. 8, the alloy coating film shown here is the same as the alloy coating film according to the first embodiment in that it includes the diffusion barrier layer 200 and the aluminum reservoir layer 300 on the substrate 100 and includes the interlayer 400 between the substrate 100 and the diffusion barrier layer 200. However, the alloy coating film according to the second embodiment is different in phases, texture and structure, among others, of the diffusion barrier layer 200.

More specifically, the diffusion barrier layer 200 includes a first phase that is the Re—Cr—Ni—Al system σ phase, and one or more second phases selected from the group consisting of the γ phase, γ' phase and β phase. These first and second phases have conjugate relations, for example in a Ni—Al—Cr—Re system phase diagram, between σ and γ phases, between σ and γ' phases, between γ and β phases, among σ, γ and γ' phases, among σ, γ and β phases, among σ, γ' and β phases and among σ, γ, γ' and β phases, respectively, and have end compositions of conjugate lines. The second phase includes, for example, a Ni—Cr—Al—Re system γ phase containing Al by 0.01~15 atomic %, Cr, W and Mo by 5~45 atomic % in total, Re by 0.01~10 atomic % and Ni, Co and Fe by 33~91.9 atomic % in total; a Ni—Cr—Al—Re system γ' phase containing Al by 16~28 atomic %, Cr, W and Mo by 1~10 atomic % in total, Re by 0.01~2 atomic % and Ni, Co and Fe by 60~82 atomic % in total; and a Ni—Cr—Al—Re system β phase containing Al by 30~50 atomic %, Cr, W and Mo by 0.01~10 atomic % in total, Re by 0.01~1 atomic % and Ni, Co and Fe by 40~68.8 atomic % in total.

The second phase (γ-phase 222, γ' phase 224, β phase 226) is preferably enclosed inside the diffusion barrier layer 200 comprising the σ phase 201. By enclosing the second phase in the diffusion barrier layer 200 comprising the σ phase 201, it is possible to effectively prohibit diffusion of Al from the aluminum reservoir layer 300 into the substrate 100 and diffusion of alloy elements of the substrate 100 into the aluminum reservoir layer 300.

If, in contrast, the second phase comprising the γ phase 212, γ' phase 214 and β phase 216 penetrates the σ phase 201 into connection with the intermediate layer 400 and the aluminum reservoir layer 300 as shown in FIG. 8, then the second phase acts as a channeling for undesirable diffusion of Al from the aluminum reservoir layer 300 into the substrate 100 (including the interlayer 400) and undesirable diffusion of alloy elements into the aluminum reservoir layer 300. This causes degradation of the resistance to oxidation of the aluminum reservoir layer 300 as well as deterioration of mechanical properties of the substrate 100 due to precipitation of a TCP phase.

In case the diffusion barrier layer 200 is a mixture of the σ phase 201 and a second phase, the second phase can contain a large amount of solid solution of Al as already explained. Therefore, average Al concentration of the diffusion barrier layer 200 can be raised to 1 atomic % or more.

In the other respects, the second embodiment is the same as the first embodiment.

The second embodiment has the same advantages as those of the first embodiment.

An experiment of diffusion coupling was carried out to prove diffusion barrier characteristics of the diffusion barrier layer 200 comprising the σ phase alone in the alloy film according to the first embodiment and the diffusion barrier layer 200 comprising a mixture of the σ phase and the second layer in the alloy coating film according to the second embodiment. For comparison purposes, alloy materials with no diffusion barrier layer were also subjected to a similar experiment. Contents of experiments, method of analysis and obtained results are explained below in detail.

Used as the substrate 100 was a second-generation Ni-based single crystal superalloy having the nominal composition (in weight %) shown in TABLE 6. This alloy was applied on its surface with three-layer plating of Ni—Re alloy plating, Ni—W plating and Ni plating in the diffusion barrier A and the diffusion barrier B, and two-layer plating of Ni—Re alloy plating and Ni plating in the diffusion barrier C. Subsequently, the substrate now having the plated film was subjected to chromium diffusion treatment. More specifically, mixed powder comprising Ni-30 alloy powder and NH$_4$Cl powder and Al$_2$O$_3$ powder was prepared as a chromium diffusion treatment. The substrate having the plated film was immersed into the mixed powder, and underwent a heat treatment in an argon gas atmosphere. Heating temperatures and lengths of time were: 1280° C. and four hours for the diffusion barrier A; and 1150° C. and four hours for the diffusion barriers B and C. Resulting compositions of the diffusion barriers A, B and C are shown in TABLE 6. In TABLE 6, for each barrier layer, the lower numeric is the concentration range, and the upper numeric is the average.

TABLE 6

| | Al | Ni | Hf | Cr | Co | Re | W | Ta | Ti | Mo |
|---|---|---|---|---|---|---|---|---|---|---|
| Ni-based superalloy | 12.2 | 66.02 | 0.035 | 5.85 | 8.22 | 0.8 | 2.94 | 2.06 | 0.65 | 1.23 |
| Diffusion barrier A | 0.6 | 14.5 | — | 21 | 4.5 | 41 | 13 | 0.1 and below | 0.1 and below | 5 |
| | 0.4~0.8 | 14~15 | — | 20~22 | 6~3 | 38~46 | 12~14 | 0.1 and below | 0.1 and below | 4~6 |
| Diffusion barrier B | 1.75 | 17.0 | — | 17.5 | 4.5 | 42 | 11 | 0.55 | 0.1 and below | 5 |
| | 1.5~2.0 | 16~18 | — | 16~19 | 4~5 | 38~42 | 9~12 | 0.5~0.6 | 0.1 and below | 4~6 |
| Diffusion barrier C | 5.25 | 21 | | 37 | 6 | 21.5 | 3.5 | 0.55 | 0.1 and below | 5 |
| | 4.5~6.0 | 20~22 | — | 35~39 | 5~7 | 20~25 | 3~5 | 0.5~0.6 | 0.1 and below | 4~6 |

Upper values of barrier layers are average values and lower values are temperature ranges With reference to the data of TABLE 6, the diffusion barrier A has the composition comprising 0.60 atomic % for Al, 19.0 atomic % for the sum of Ni and Co, 34.0 atomic % for the sum of Cr and W, and 46.0 atomic % for the sum of Re and Mo. The diffusion barrier B has the composition comprising 1.75 atomic % for Al, 21.5 atomic % for the sum of Ni and Co, 28.5 atomic % for the sum of Cr and W, and 47.0 atomic % for the sum of Re and Mo. The diffusion barrier C has the composition comprising 5.25 atomic % for Al, 27.0 atomic % for the sum of Ni and Co, 40.5 atomic % for the sum of Cr and W, and 26.5 atomic % for the sum of Re and Mo. Therefore, the composition of the diffusion barrier A falls in the meshed zone in FIG. 6, and its Al concentration is less than 1 atomic %. As to the diffusion barrier B, the composition falls in the meshed zone in FIG. 6, but the Al concentration is 1 atomic % or more. On the other hand, in case of the diffusion barrier C, its Ni+Co composition is larger than the meshed zone in FIG. 6, and falls in two phase zones, i.e., σ phase and γ phase. In addition, the Al concentration is high as well.

Cross-sectional textures of the diffusion barrier A, diffusion barrier B and diffusion barrier B shown in TABLE 6 were observed, and the diffusion barrier A was confirmed to comprise the σ phase alone. However, as a result of observation of the cross-sectional textures of the diffusion barrier B and the diffusion barrier C, the matrices (base materials) of these diffusion barrier layers were confirmed to comprise σ phases and include minute second phases as small as 1 μm or less. Since these second phases were narrow in width (approximately 1 μm), quantitative concentration analysis of their compositions by EPMA was impossible. However, the second phases are considered to be γ phases in which Al and Cr are solid-solved. The second phase of the diffusion barrier C, when compared with that of the diffusion barrier B, are approximately equal in size and shape, but more in quantity such that it locally forms a so-called channel connecting the substrate 100 (including the interlayer 400) and the aluminum reservoir layer 300.

As a counterpart alloy of the aforementioned diffusion couple, the β phase that is one constituent phases of the aluminum reservoir layer 300 was selected. The β phase alloy was prepared by arc melting, and the Al concentration was approximately 50 atomic %. The surface of the diffusion barrier layer formed on the substrate and the surface of the β phase alloy were mirror-polished into flat planes, and the polished surfaces were bonded together to make a diffusion couple. In a diffusion couple without the diffusion barrier layer, the surface of the substrate was mirror-polished, and used to make a diffusion couple with the β phase alloy. The diffusion couples were subjected to heat treatment at 1150° C. for 9 hours and 25 hours in vacuum. Obtained diffusion couples were cut vertically at a central portion, and after polishing, concentration distributions of Al, Ni and alloy elements contained in the substrate were quantitatively measured by EPMA.

Figure 10:
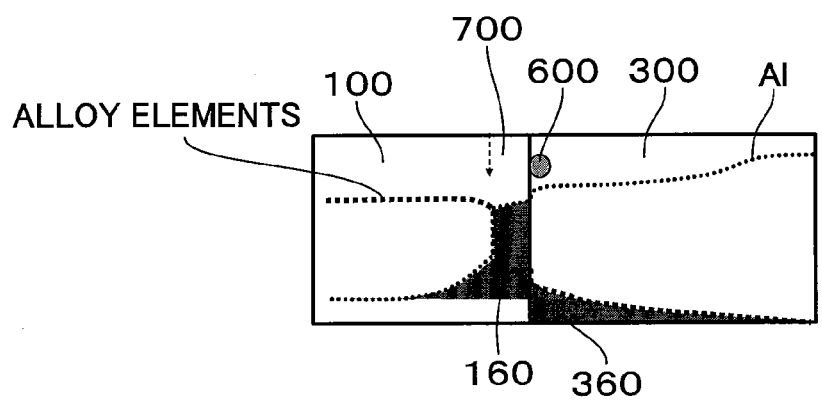
FIG. 10 is a cross-sectional view of a diffusion couple used to evaluate diffusion barrier characteristics of a diffusion barrier layer in an alloy coating film according to the present invention.

FIGS. 9 and 10 schematically show cross-sectional structures of the diffusion couples, Al concentrations and distributions of individual elements that were measured by EPMA. FIG. 9 shows a result of the diffusion couple with the diffusion barrier A, diffusion barrier B and diffusion barrier C. FIG. 10 shows a result of the diffusion couple having no diffusion barrier.

In FIG. 9, the diffusion couple is made by the substrate 100, interlayer 400 and diffusion barrier layer 200, as one part, and the aluminum reservoir layer 300 comprising the β phase alloy, as the other part. In FIG. 10, the diffusion couple is made by the substrate 100 and the aluminum reservoir layer 300 comprising the β phase alloy. Reference numeral 700 denotes a zone commonly known as a secondary reaction zone (SRZ) formed in the Ni-based superalloy by diffusion between the Ni-based superalloy and the β phase alloy. Reference numeral 600 denotes is a portion commonly known as a marker, which is a thin alumina fiber (about 7μ□ in diameter) inserted into the interface between the Ni-based superalloy and the β phase alloy in the process of forming the diffusion couple.

With reference to FIG. 9, diffusion amounts (fluxes) of individual elements were approximately calculated as the meshed zone 350 from respective concentration distributions of alloy elements diffusing into the β phase alloy from the interface between the diffusion barrier layer 200 and the aluminum reservoir layer 300 comprising the β phase alloy. The diffusion flux of Al entering into the substrate is given by the meshed zone 150. In FIG. 10, diffusion fluxes of alloy elements entering into the β phase alloy are given by the meshed zone 360, and the diffusion flux of Al entering into the substrate is given by the meshed zone 160.

Diffusion fluxes of respective elements were obtained from the results shown in FIGS. 9 and 10, and diffusion fluxes of individual elements in the diffusion barrier A, diffusion barrier B and diffusion barrier C were evaluated as relative values relative to diffusion couples with no diffusion barrier. Obtained results are collectively shown in TABLE 7. From these results, it is apparent that diffusion of any elements is restrained in any of the diffusion barrier A, diffusion barrier B and diffusion barrier C in comparison with the samples with no diffusion barrier. Especially, it is appreciated that the diffusion barrier A prevents diffusion of the elements more effectively. When viewed In a greater detail, in the diffusion barrier A, Ta, Mo, Ti and W decreased to approximately 1/10 or less as compared to those in the samples without the diffusion barrier, and Co, Al and Cr decreased to 1/6 through 1/4 as well. In the diffusion barrier B, Ta decreased to 1/10 or less, Co and W to approximately 1/6, and Cr Al and Ti to 1/4 through 1/2. The diffusion barrier C, however, is not so effective to prohibit diffusion as compared with the diffusion barriers A and B.

TABLE 7

|  | Al | Cr | Co | W | Ti | Mo | Ta |
|---|---|---|---|---|---|---|---|
| No diffusion barrier | 1 | 1 | 1 | 1 | 1 | 1 | 1 |
| Diffusion barrier A | 0.15 | 0.24 | 0.15 | 0.10 and below | 0.11 | 0.10 and below | 0.10 and below |
| Diffusion barrier B | 0.34 | 0.25 | 0.17 | 0.15 | 0.54 | 0.41 | 0.10 and below |
| Diffusion barrier C | 0.60 | 0.25 | 0.25 | 0.15 | 0.70 | 0.55 | 0.20 and below |

Data of TABLE 6 and TABLE 7 has proved that the diffusion barrier layer exhibits an excellent diffusion barrier property when its constituent phase is the σ phase and its Al concentration is less than 1 atomic % as the data of the diffusion barrier A shows. However, even when the main constituent phase of the diffusion barrier layer is the σ phase, if it contains a second phase such as the γ phase as well, the diffusion barrier property degrades as proved by the diffusion barrier B. Further, if the diffusion barrier layer further contains a large amount of a second phase and forms a channel connecting the substrate and the aluminum reserver layer as the diffusion barrier C does, the diffusion barrier property degrades significantly.

Therefore, the channel 88 shown in FIG. 3 is considered to have been formed as a result of diffusion of Al into the substrate 10 and diffusion of alloy elements into the aluminum reservoir layer 20, respectively, through the second phase contained in the diffusion barrier layer 30.

Next, according to Literature 11, the alloy coating film that includes a Re-contained alloy Re content alloy as a diffusion barrier is produced at a high temperature of 1250~1280° C. However, at such a high temperature, the substrate surface may change in conformation and, especially in case of a Ni-based superalloy, coarsening of crystal grains by recrystallization may occur.

Masakazu Okazaki, Issei Ohtera, Yoshio Harada: Report of the 123$^{rd}$ Committee on Heat Resisting Materials and Alloys, Vol. 42, No. 3, 341-349 (2001) reports that coarsening of texture of a Ni-based superalloy was observed in case of MCrAlY overlay coating of by thermal spraying as well, and markedly degraded the mechanical properties of the substrate. It is therefore considered, in general, that coating films are produced at temperatures from 800° C. to 1150° C., and more preferably at 1120° C. or less.

For producing the alloy coating films having Re—Cr—Ni—Al system σ phases as their diffusion barrier layers according to the first and second embodiments, since the σ phase has a very small diffusion coefficient as shown in TABLE 3, the temperature is preferably controlled in the range from 1250° C. to 1340° C. However, this level of temperature causes coarsening of the substrate texture. Heretofore, no proposals have been made about measures for preventing coarsening of texture of substrate.

Taking it into consideration, next explained is an embodiment for adding B to the interlayer 400 shown in FIG. 7 to prevent coarsening of the substrate texture. Note, however, that this embodiment should not be construed to limit the scope of the invention.

In this embodiment, a second generation Ni-based single crystal superalloy (TMS-82+ ("TMS" is a registered trademark)) was used as a substrate. Nominal composition (in atomic %) of this superalloy is shown in TABLE 6. Three kinds of alloy films were formed in this embodiment. Example 1 and Example 2 were added with B, but Example 3 was not added with B.

Strip specimens were cut out from the above substrate and treated by surface grinding (wet grinding by #150~600 emery paper) and degreasing cleaning (ultrasonic cleaning in acetone). Thereafter, films were formed on substrate surfaces in the following procedures.

First, a Ni—B alloy coating films was formed on each substrate surface by electroless plating. Further, a Re—Ni alloy, Ni—W alloy and Ni film were formed by electroplating. Instead of the Ni—B alloy, a Ni—W—B alloy may be formed by electroless plating.

More specifically, in case of forming diffusion barrier layer alloy coating films on substrate surfaces, such films were formed on respective metals in the following procedures.

Example 1 (with Addition of B)

| (1) Ni plating (strike bath): | 0.1 μm thick: | To improve adhesiveness between the substrate and the film. |
|---|---|---|
| (2) Ni plating (Watts bath): | 2 μm thick: | To form the interlayer. |
| (3) Ni—B alloy electroless plating: | 0.5 μm thick: | To add B to the interlayer. |
| (4) Re—Ni alloy plating | 5 μm thick: | To form the diffusion barrier layer. |
| (5) Ni—W alloy plating | 2 μm thick: | To add W to the diffusion barrier layer. |
| (6) Ni plating (Watts bath): | 2 μm thick: | To protect the entire plated film. |

Example 2 (with Addition of B)

| (1) Ni plating (strike bath): | 0.1 μm thick: | To improve adhesiveness between the substrate and the film. |
|---|---|---|
| (2) Ni plating (Watts bath): | 2 μm thick: | To form the interlayer. |
| (3) Ni—W—B alloy electroless plating: | 0.2 μm thick: | To add B to the interlayer. |
| (4) Re—Ni alloy plating | 5 μm thick: | To form the diffusion barrier layer. |
| (5) Ni—W alloy plating | 1.8 μm thick: | To add W to the diffusion barrier layer. |
| (6) Ni plating (Watts bath): | 2 μm thick: | To protect the entire plated film. |

Example 3 (without Addition of B)

| (1) Ni plating (strike bath): | 0.1 μm thick: | To improve adhesiveness between the substrate and the film. |
|---|---|---|
| (2) Ni plating (Watts bath): | 2 μm thick: | To form the interlayer. |
| (3) Re—Ni alloy plating | 5 μm thick: | To form the diffusion barrier layer. |
| (4) Ni—W alloy plating | 2 μm thick: | To add W to the diffusion barrier layer. |
| (5) Ni plating (Watts bath): | 2 μm thick: | To protect the entire plated film. |

The substrates now having the films of Example 1, Example 2 and Example 3 were subjected to Cr diffusion treatment. More specifically, the substrates now having the films were immersed into mixed powder (Ni-30 Cr alloy powder+Ni$_2$Al$_3$ powder+NH$_4$Cl+Al$_2$O$_3$ powder (weight ratio 8:1:1:4)) in an alumina crucible, and heated in an argon gas atmosphere at 1280° C. for four hours.

Cross-sectional textures of the diffusion barrier layers formed in Example 1, Example 2 and Example 3 were observed, and concentrations distributions of individual elements were measured by EPMA. A result of analysis of elements and compositions of the interlayers and diffusion barrier layers are shown in TABLE 8.

TABLE 8

| Example 1 | Ni | Al | Cr | Re | B | W | Ti | Ta | Mo | Hf | Co | No coarsening |
|---|---|---|---|---|---|---|---|---|---|---|---|---|
| Interlayer | rest | 12 | 5 | 1.3 | 0.2 | 0.1 | 0.2 | 0.3 | 0.5 | 0.05 | 3.0 | |
| | rest | 10~14 | 4~6 | 0.9~1.5 | 0.1~0.4 | 0.1 | 0.2 | 0.3 | 0.5 | 0.05 | 3.0 | |
| Diffusion barrier layer | 20 | 0.6 | 33 | 32 | — | 14 | — | — | 0.2 | 0.1 | 1 | |
| | 17~23 | 0.3~0.9 | 30~35 | 30~35 | — | 13~15 | — | — | 0.2 | 0.1 | 1 | |
| Example 2 | Ni | Al | Cr | Re | B | W | Ti | Ta | Mo | Hf | Co | No coarsening |
| Interlayer | rest | 12.5 | 5 | 1.2 | 0.25 | 0.1 | 0.2 | 0.3 | 0.5 | 0.05 | 2.5 | |
| | rest | 11~14 | 4~6 | 0.9~1.5 | 0.1~0.4 | 0.1 | 0.2 | 0.3 | 0.5 | 0.05 | 2~3 | |
| Diffusion barrier layer | 19 | 0.6 | 32.5 | 32.5 | — | 14 | — | — | 0.2 | 0.1 | 2 | |
| | 16~22 | 0.3~0.9 | 30~35 | 30~35 | — | 12~16 | — | — | 0.2 | 0.1 | 2 | |
| Example 3 | Ni | Al | Cr | Re | B | W | Ti | Ta | Mo | Hf | Co | Coarsening |
| Interlayer | rest | 11 | 5 | 1.2 | — | 0.1 | 0.2 | 0.3 | 0.5 | 0.05 | 3 | |
| | rest | 9~13 | 4~6 | 0.9~1.5 | — | 0.1 | 0.2 | 0.3 | 0.5 | 0.05 | 3 | |
| Diffusion barrier layer | 17.5 | 0.8 | 37.5 | 29 | — | 12 | — | — | 0.2 | 0.1 | 1 | |
| | 15~20 | 0.7~0.9 | 35~40 | 27~31 | — | 9~14 | — | — | 0.2 | 0.1 | 1 | |

As shown in TABLE 8, by forming the Ni—B system alloy coating film or Ni—W—B system alloy coating film by electroless plating, it was possible to add B of (0.1~0.4) atomic % to the interlayer sandwiched between the substrate and diffusion barrier layer. Coarsening of texture of substrates having formed the films was not observed in Example 1 and Example 2. In Example 3, however, coarsening of substrate texture was locally observed, and precipitation of TCP was confirmed as well.

As explained above, addition of B into the interlayer makes it possible to prevent coarsening of the substrate texture and enables formation of the diffusion barrier layer at temperatures as high as 1150° C. or more. Without being limited to B, addition of Zr, Hf or C as well is expected to be effective for prevention of coarsening of the substrate texture.

Heretofore, embodiments and examples of the present invention have been explained specifically. However, the present invention is not limited to these embodiments and examples, but contemplates various changes and modification based on the technical concept of the present invention.

DESCRIPTION OF REFERENCE NUMERALS

100 Substrate
200 Diffusion Barrier Layer
201 σ Phase
212 γ Phase
214 γ' Phase
216 β Phase
222 γ Phase
224 γ' Phase
226 β Phase
300 Aluminum Reservoir Layer
400 Interlayer

The invention claimed is:

1. An alloy coating film comprising:
    a diffusion barrier layer on a substrate; and
    an aluminum reservoir layer on said diffusion barrier layer,
    wherein said diffusion barrier layer is composed of a single phase which is a Re—Cr—Ni—Al system σ phase containing Al by less than 1 atomic %.

2. The alloy coating film according to claim 1 wherein said σ phase contains Al by 0.01~0.99 atomic %.

3. The alloy coating film according to claim 1 wherein the σ phase has a conjugate relation with one or more phases selected from the group consisting of Ni—Al—Cr—Re system γ phase, γ' phase and β phase and has end compositions of conjugate lines.

4. The alloy coating film according to claim 1 wherein said σ phase contains Ni, Co and Fe by 15~25 atomic % in total, Cr and W by 20~60 atomic % in total and Re and Mo by 20~55 atomic % in total, and the total amount of these Ni, Co, Fe, Cr, W, Re and Mo is less than 100 atomic %.

5. The alloy coating film according to claim 4 wherein an atomic % of said Re relative to the total atomic % of Re and Mo occupies a ratio equal to or more than 0.5.

6. The alloy coating film according to claim 1 wherein said diffusion barrier layer additionally contains one or more elements selected from the group consisting of V, Nb, Ta, Pt, Ir, Ru, Ti, Mn, Si, Hf, Y, C and B by 0.01~5 atomic %.

7. The alloy coating film according to claim 1 wherein said aluminum reservoir layer comprises one or more phases consisting of the group consisting of:
    a Ni—Cr—Al—Re system β phase which contains Al by 30~50 atomic %, Cr by 0.01~10 atomic %, Re by 0.01~1 atomic % and Ni by 40~69.8 atomic %, and in which the total amount of Al, Cr, Re and Ni is equal to or less than 100 atomic %; and
    a Ni—Cr—Al—Re system γ' phase which contains Al by 16~28 atomic %, Cr by 0.01~8 atomic %, Re by 0.01~2 atomic % and Ni by 67~80.8 atomic %, and in which the total amount of Al, Cr, Re and Ni is equal to or less than 100 atomic %; and a Ni—Cr—Al—Re system γ phase which contains Al by 5~15 atomic %, Cr by 5~45 atomic %, Re by 0.01~8 atomic % and Ni by 39~89.8 atomic %, and in which the total amount of Al, Cr, Re and Ni is equal to or less than 100 atomic %.

8. The alloy coating film according to claim 7 wherein said aluminum reservoir layer contains one or more elements selected from the group consisting of V, Nb, Ta, Pt, Ir, Ru, Co, Fe, Ti, Mn, Si, Hf, Zr and Y by 0.01~5 atomic %.

9. The alloy coating film according to claim 1 further comprising an interlayer between said substrate and said diffusion barrier layer.

10. The alloy coating film according to claim 9 wherein said interlayer comprises:
   a Ni—Cr—Al—Re system γ' phase which contains Al by 16~28 atomic %, Cr by 0.01~8 atomic %, Re by 0.01~2 atomic % and Ni by 67~83.7 atomic %, and in which the total amount of Al, Cr, Re and Ni is equal to or less than 100 atomic %;
   a Ni—Cr—Al—Re system γ phase which contains Al by 5~15 atomic %, Cr by 5~45 atomic %, Re by 0.01~8 atomic % and Ni by 39~89.8 atomic %, and in which the total amount of Al, Cr, Re and Ni is equal to or less than 100 atomic %; and
   a Re—Cr—Ni—Al system σ phase which contains Al by 0.01~0.99 atomic %.

11. The alloy coating film according to claim 10 wherein said interlayer further contains one or more elements selected from the group consisting of V, Nb, Ta, Pt, Ir, Ru, Co, Fe, Ti, Mn, Si, Hf, Zr, Y, C and B by 0.01~5 atomic %.

12. The alloy coating film according to claim 1 wherein said diffusion barrier layer lies on said substrate as a continuous film.

13. An alloy coating film comprising:
   a diffusion barrier layer on a substrate; and
   an aluminum reservoir layer on said diffusion barrier layer,
   wherein said diffusion barrier layer is composed of a first phase which is a Re—Cr—Ni—Al system σ phase and one or more second phases selected from the group consisting of a γ phase, γ' phase and β phase.

14. The alloy coating film according to claim 13 wherein said second phase is enclosed inside said diffusion barrier layer.

15. The alloy coating film according to claim 13 wherein said first phase and said second phase have, in a Ni—Al—Cr—Re system phase diagram, conjugate relations between the σ phase and the γ phase, between the σ phase and the γ' phase, between the σ phase and the β phase, among the σ phase, γ phase and γ' phase, among the σ phase, γ phase and β phase, among the σ phase, γ' phase and β phase, and among the σ phase, γ phase, γ' phase and β phase, respectively, and have end compositions of conjugate lines.

16. The alloy coating film according to claim 13 wherein the second phase comprises:
   a Ni—Cr—Al—Re system γ phase which contains Al by 0.01~15 atomic % Cr, W and Mo by 5~45 atomic % in total, Re by 0.01~10 atomic %, and Ni, Co and Fe by 33~91.9 atomic % in total, and in which the total amount of Al, Cr, W, Mo, Re, Ni, Co and Fe is equal to or less than 100 atomic %;
   a Ni—Cr—Al—Re system γ' phase which contains Al by 16~28 atomic %, Cr, W and Mo by 1~10 atomic % in total, Re by 0.01~2 atomic %, and Ni, Co and Fe by 60~82 atomic % in total, and in which the total amount of Al, Cr, W, Mo, Re, Ni, Co and Fe is equal to or less than 100 atomic %; and
   a Ni—Cr—Al—Re system β phase which contains Al by 30~50 atomic %, Cr, W and Mo by 0.01~10 atomic % in total, Re by 0.01~1 atomic %, and Ni, Co and Fe by 40~68.8 atomic % in total, and in which the total amount of Al, Cr, W, Mo, Re, Ni, Co and Fe is equal to or less than 100 atomic %.

17. A method of producing an alloy coating film including:
a diffusion barrier layer on a substrate; and
an aluminum reservoir layer on said diffusion barrier layer,
   wherein said diffusion barrier layer is composed of a single phase which is a Re—Cr—Ni—Al system σ phase containing Al by less than 1 atomic %,
said method comprising:
   forming said diffusion barrier layer and said aluminum reservoir layer on said substrate by two or more processes selected from the group consisting of plating, heat treatment, Cr diffusion treatment and Al diffusion treatment.

18. A method of producing an alloy coating film including:
a diffusion barrier layer on a substrate; and
an aluminum reservoir layer on said diffusion barrier layer,
   wherein said diffusion barrier layer is composed of a first phase which is the σ phase of a Re—Cr—Ni—Al system and one or more second phases selected from the group consisting of a γ phase, γ' phase and β phase,
said method comprising:
   forming said diffusion barrier layer and said aluminum reservoir layer on said substrate by two or more processes selected from the group consisting of plating, heat treatment, Cr diffusion treatment and Al diffusion treatment.

19. A heat resistant metal member comprising:
a diffusion barrier layer on a metal substrate; and
an aluminum reservoir layer on said diffusion barrier layer,
   wherein said diffusion barrier layer is composed of a single phase which is a Re—Cr—Ni—Al system σ phase containing Al by less than 1 atomic %.

20. A heat resistant metal member according to claim 19 wherein said heat resistance metal member is a part of a jet engine or a gas turbine, moving blade or stationary blade, heat exchange member or burner nozzle of a combustor or a boiler, vehicle muffler or turbocharger rotor.

21. A heat resistant metal member having an alloy coating film, comprising:
   a metal substrate;
   a diffusion barrier layer on said metal substrate; and
   an aluminum reservoir layer on said diffusion barrier layer,
   wherein said diffusion barrier layer is composed of a first phase which is a Re—Cr—Ni—Al system σ phase and one or more second phases selected from the group consisting of a γ phase, γ' phase and β phase.

* * * * *

UNITED STATES PATENT AND TRADEMARK OFFICE
CERTIFICATE OF CORRECTION

PATENT NO. : 8,173,269 B2
APPLICATION NO. : 12/520676
DATED : May 8, 2012
INVENTOR(S) : Toshio Narita It is certified that error appears in the above-identified patent and that said Letters Patent is hereby corrected as shown below:

On the cover page, "(75) Inventor" change "Toshio Narita, Sapporo (JP)" to
--Toshio Narita, Sapporo-shi (JP)--

Signed and Sealed this
Twenty-sixth Day of June, 2012

David J. Kappos
*Director of the United States Patent and Trademark Office*